Inventor
George W. Wacker
By [signature]

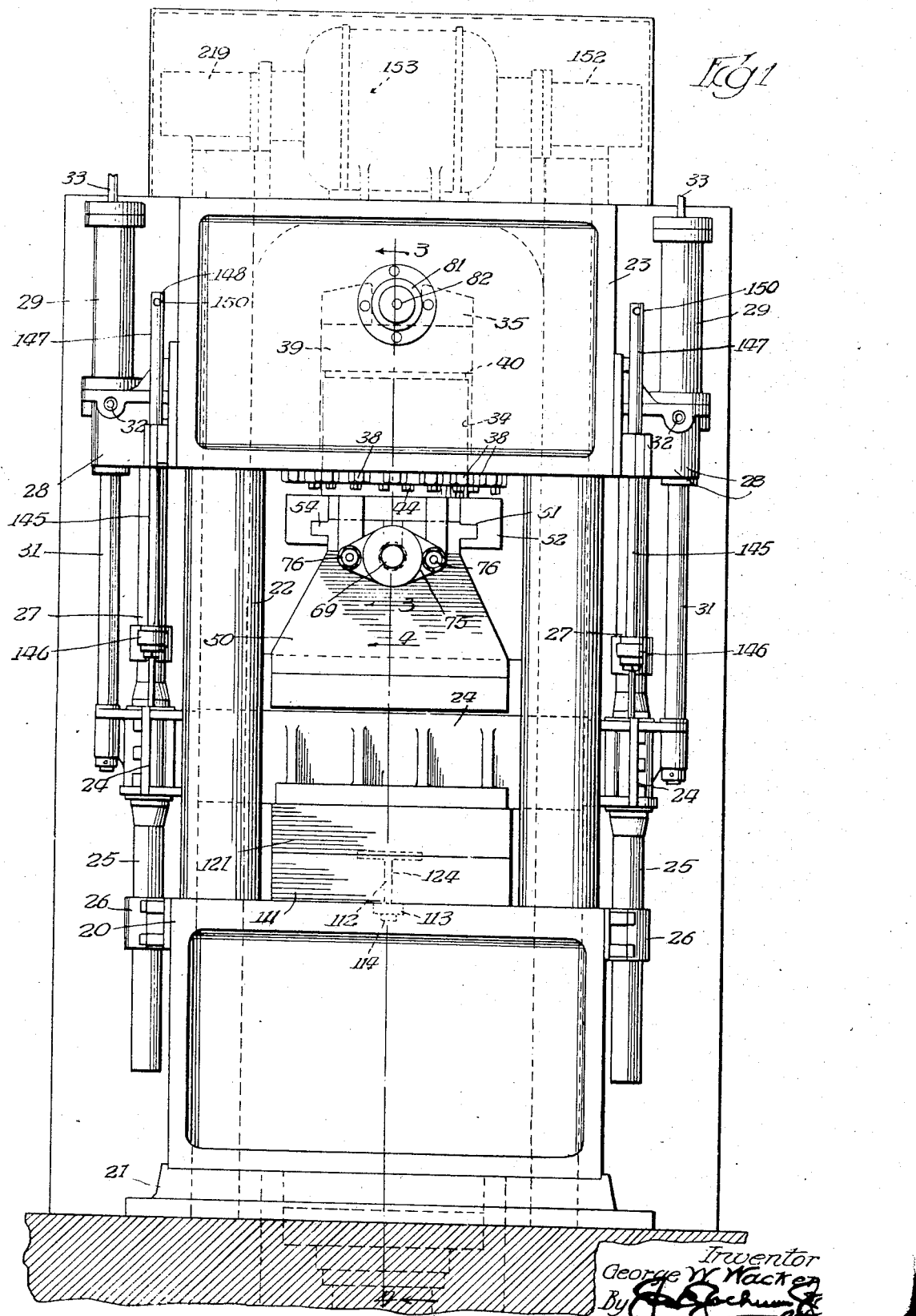

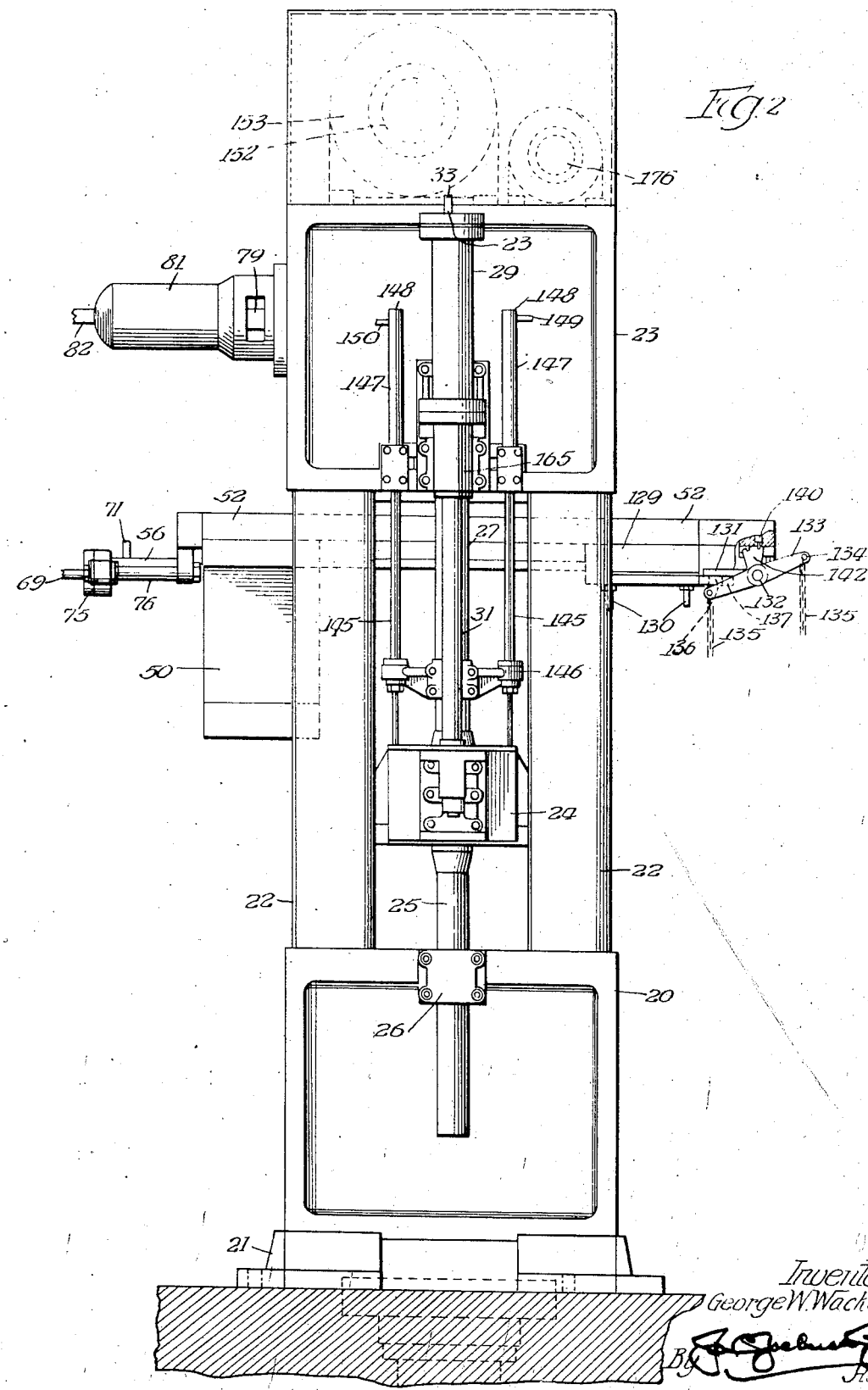

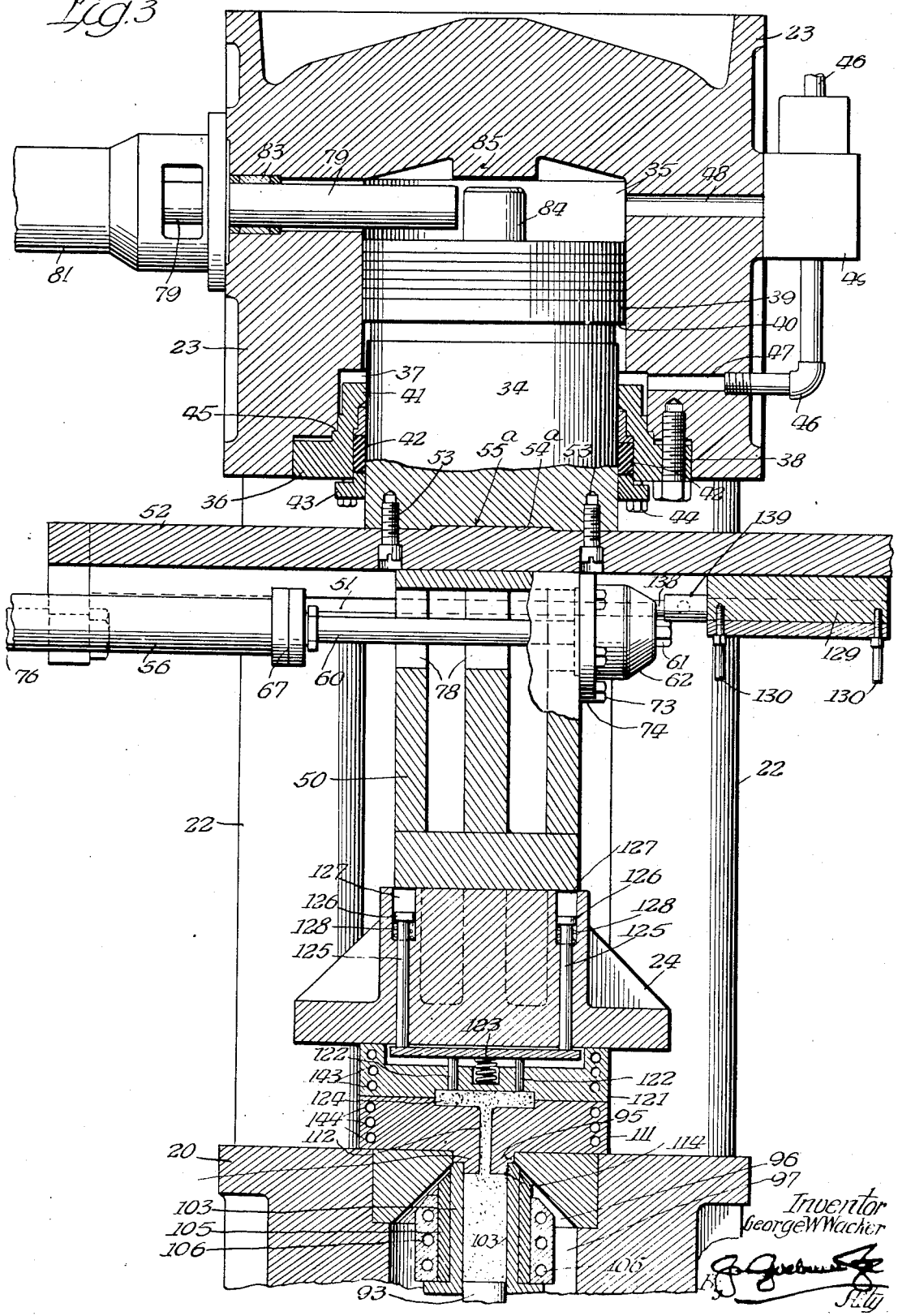

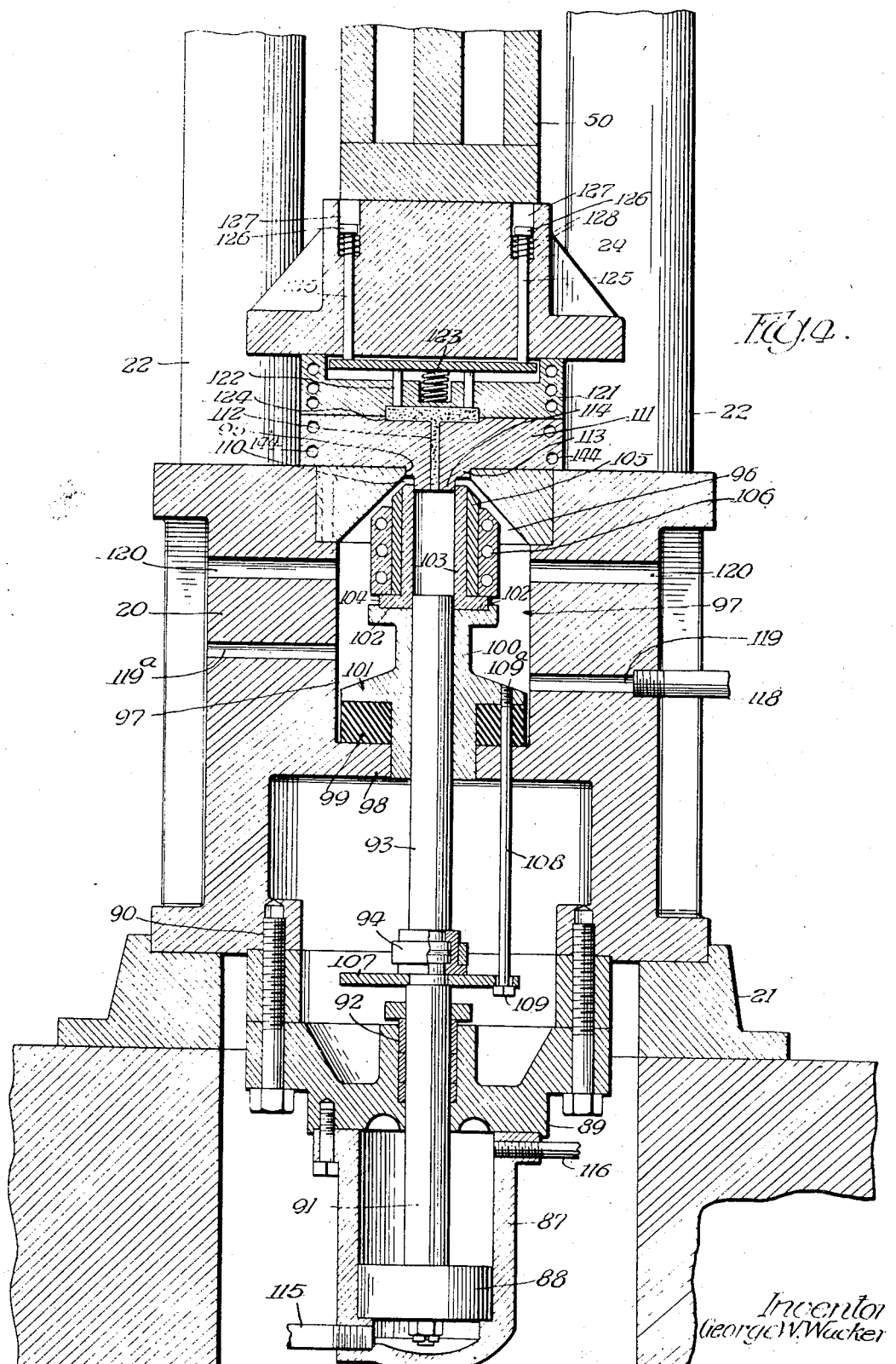

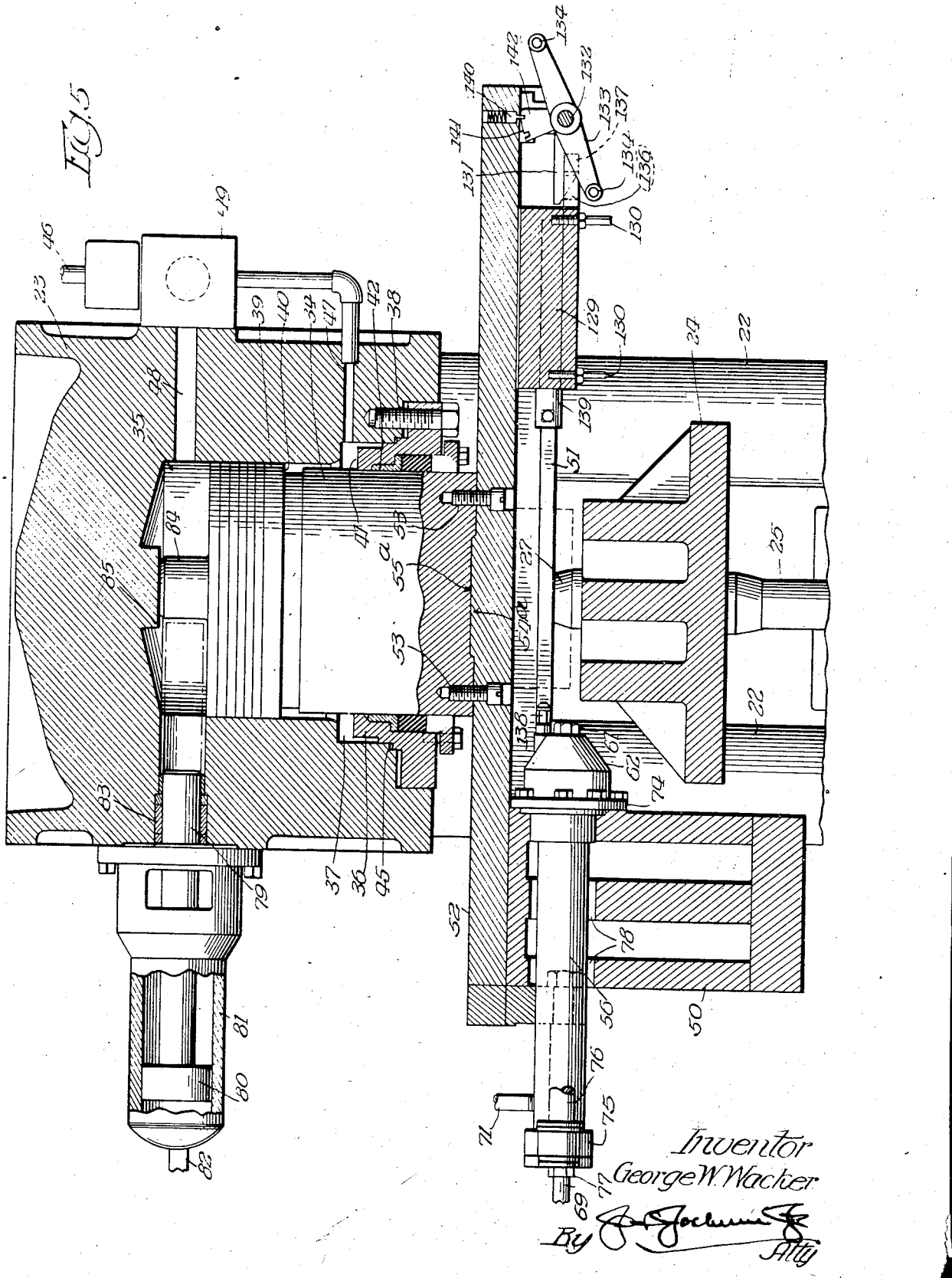

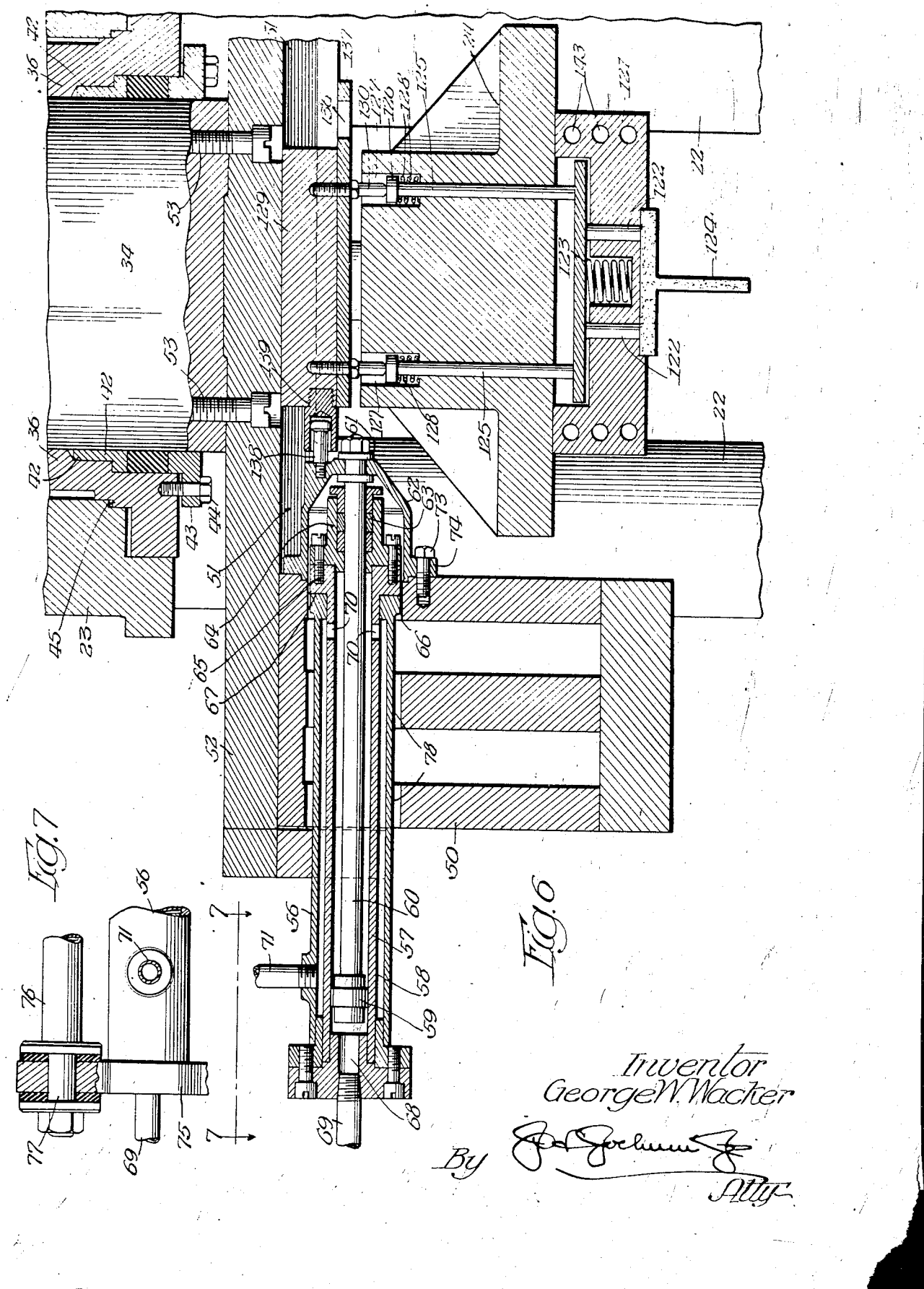

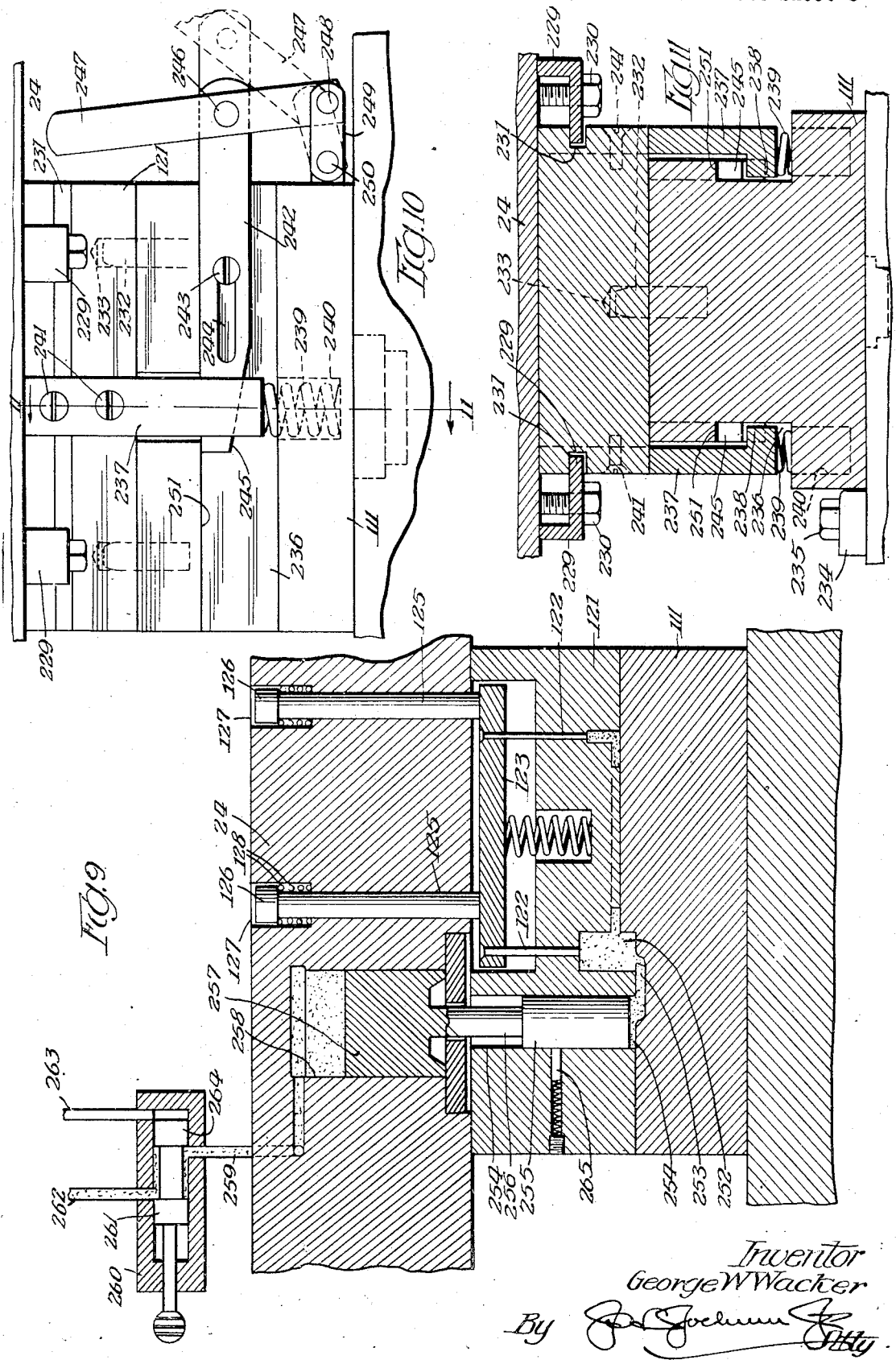

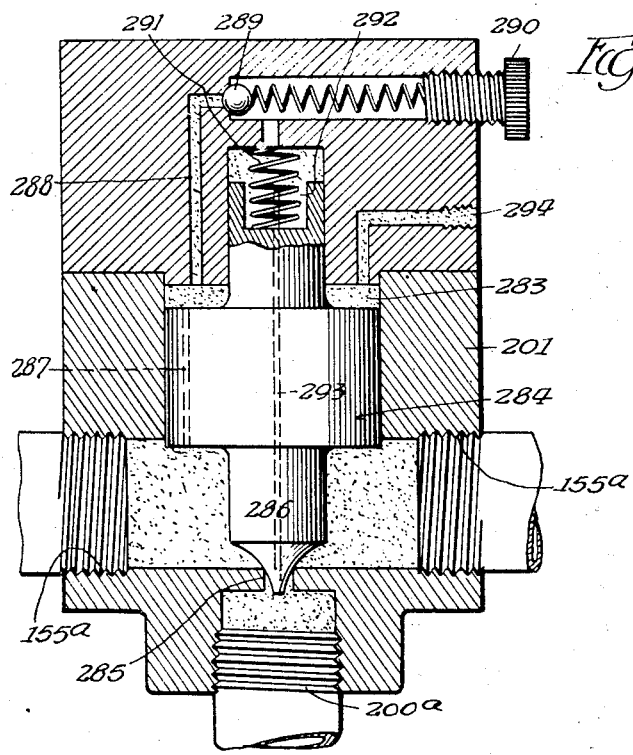
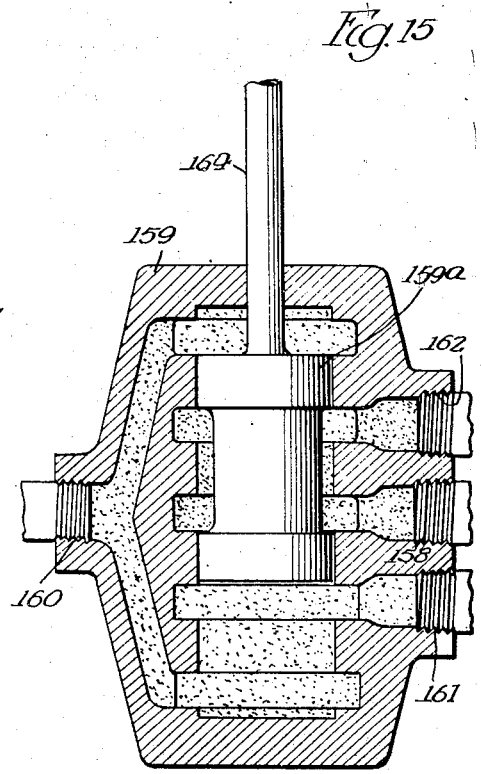
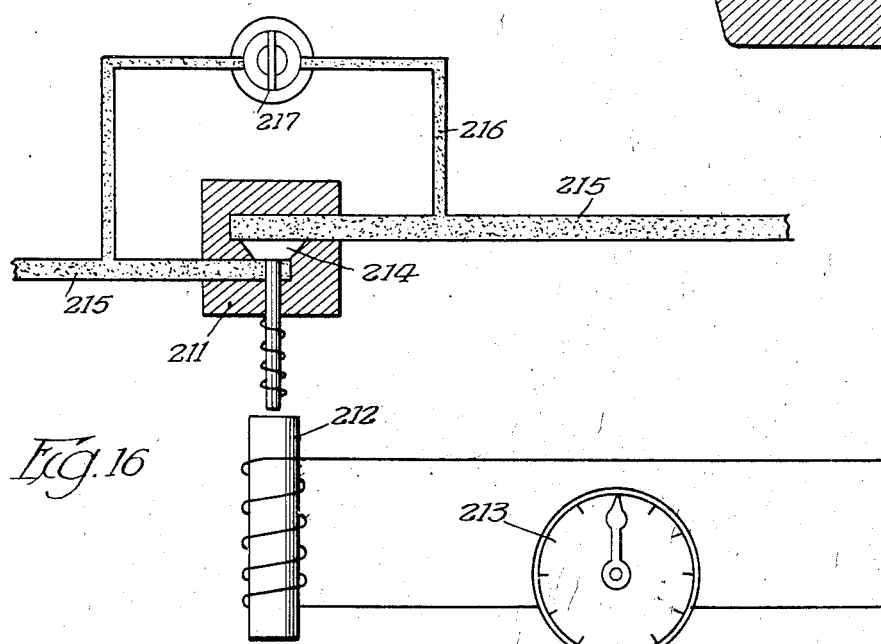
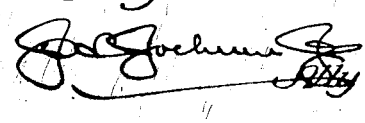

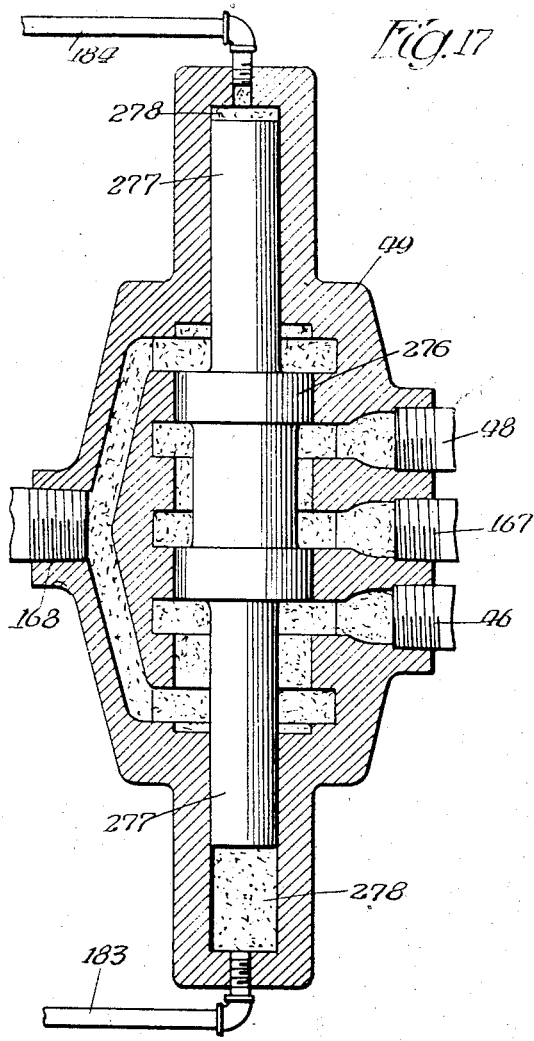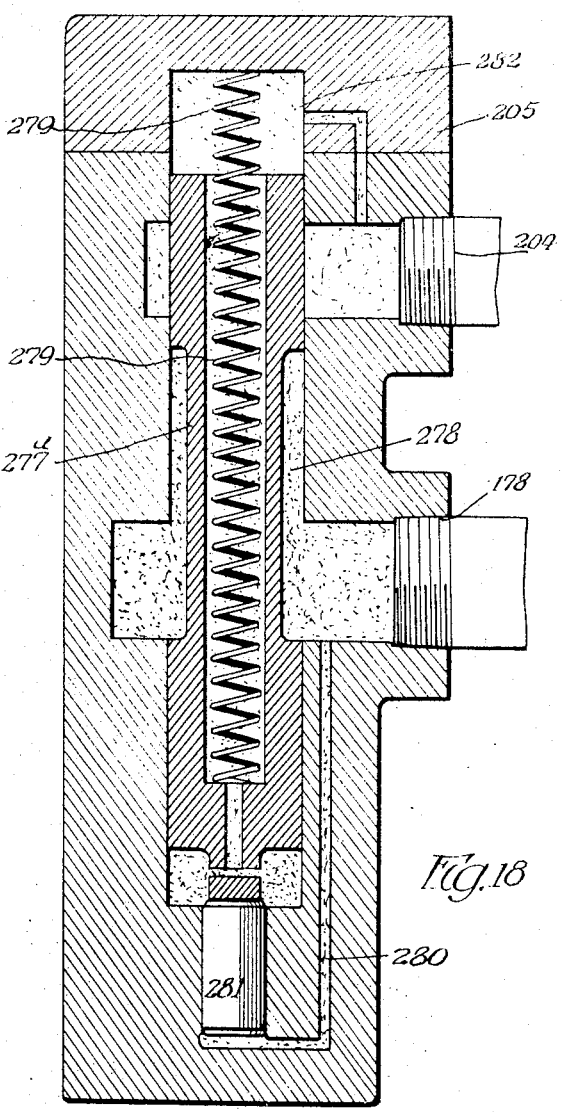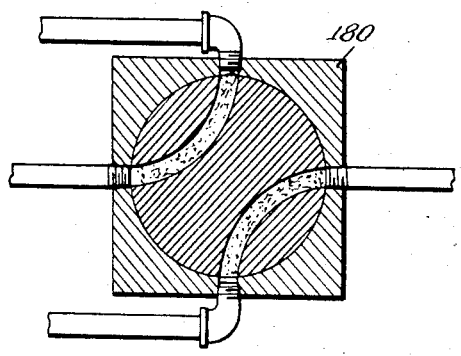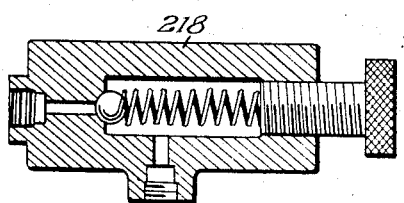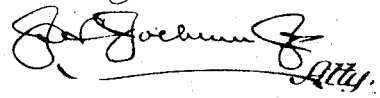

Patented Aug. 15, 1944

2,355,613

UNITED STATES PATENT OFFICE 2,355,613

PRESS FOR MOLDING PLASTIC MATERIALS

George W. Wacker, Chicago, Ill., assignor to Clearing Machine Corporation, Chicago, Ill., a corporation of Illinois Original application March 5, 1941, Serial No. 381,841. Divided and this application October 10, 1941, Serial No. 414,496

14 Claims. (Cl. 18—16)

This application is a division of application, Serial Number 381,841, filed March 5, 1941, and relates to improvements in a press for molding plastic materials, and one of the objects of the invention is to provide an improved machine or press for processing material which has been previously plasticized and is particularly adapted though not necessarily limited in its use for producing objects by injection process.

Heretofore it has been customary in injection molding machines of this character to supply the material in hard granular form and then introduce it into a heating chamber within the machine to plasticize it to a point where it may be injected or forced into a mold.

With such a press it necessitates considerable heat and time to reduce the material to such a state as to adapt it for such injection, with the result that among other things, the capacity and speed with which the machine may be operated, is controlled by the length of time necessary to properly heat the material and the use of such a method soon becomes economically impractical for the production of large pieces or objects.

Furthermore, in the prior machines it has been necessary to maintain the temperature of the heating means considerably in excess of the plasticizing temperature in order to secure reasonable and rapid heat transfer from the heating means to the material. This results in much difficulty due to overheating and burning of the material.

Furthermore, with the prior machines, it has been found necessary in order to heat the material to break it up into small streams so that the heat may surround them while being passed through the heating chamber or zone. This results in objectionable resistance to the flow of the material through the restricted passages, requiring excessive pressures, as well as presenting the objectionable and difficult task of cleaning the passages when changing the material or color.

Furthermore, mechanical difficulties will be created by the high pressures necessary and involved, causing leakage of the material past the plunger.

The articles molded or formed by the prior machines are more or less limited in mass or section, as a result of shrinkage due to dissipation of the heat in cooling, and in the inability of such machines to overcome such difficulty, for the reason that the material is forced into the mold through sprues or runners, and the portion of the material in the sprues will chill before the material in the mold cavities proper. The chilling or cooling of this portion of the material causes it to become set or hard and it cannot then be forced into commingling relation with the material which is in the mold cavity, in an attempt to compensate such shrinkage.

To provide a machine and method of molding plastic materials which will overcome these and other difficulties and objections is another object of the present invention.

A further object is to provide in a machine or press of this character for injection molding, improved means whereby the heating of the plasticized material within the machine is dispensed with, and in the operation of which machine the material will be heated and plasticized by means entirely separate from or outside the machine or press.

A further object is to provide improved means to prevent chilling of the preheated material after it has been placed in the machine and prior to injection into the mold cavity, by maintaining the temperature of the injection chamber, i. e. the chamber which receives the packaged material prior to its injection into the mold cavity, only at a temperature to maintain the material in its preheated plasticized condition.

A further object is to provide improved means for exerting pressure upon the mold elements to close the same, and improved means for increasing such pressure whereby to overcome the internal pressure of the mold created by forcing the material into the mold cavity.

A further object is to provide improved means for delivering a supply of material into the mold cavity, and improved means for augmenting the supply of material in such cavity to compensate shrinkage of the material and thereby insure accuracy in the product or article itself.

A further object is to provide in a machine of this character an improved platen for carrying and manipulating the mold and improved means for controlling the operation of the platen.

A further object is to provide an improved machine of this character embodying a ram or slide which has only a very short extent of movement thereby requiring relative small pumps or motors and a relatively small supply of fluid for operation of the slides.

A further object is to provide in a press of this character an open injection chamber for receiving the material to be injected into the mold, and which chamber is closed by one of the mold elements, and improved means whereby the mold may be raised to cover or open the injection chamber to permit free and unrestricted access to the interior of the chamber and of the placing of the material into such chamber.

A further object is to provide improved knockout mechanism for the article and improved means for rendering the knockout mechanism active and inactive at will.

A further object is to provide in a machine of this character a platen cooperating with the mold and operating with a comparatively long stroke and comparatively low pressure; a ram operating with a comparatively short stroke with great pressure; and an element adapted to be interposed between the ram and platen whereby the pressure of the ram will be exerted upon the platen in addition to the pressure directly acting upon the platen, the said element being withdrawn from between the platen and ram to permit the raising of the platen and the mold.

A further object is to provide in a machine of this character improved means whereby two steps of pressure may be exerted upon the ram.

This invention resides not only in the mechanism disclosed but also in the methods or processes carried out by the machine or press for forming articles from material which has been plasticized before being placed into the machine.

The preferred form of mechanism by means of which the methods or processes may be carried out has been illustrated in the accompanying drawings and described in connection therewith, but it is to be understood that various changes may be made in the details of construction and in the combination and arrangement of the several parts of the machine, and also changes may be made in the methods and processes. In the drawings:

Figure 1 is a front elevation of a machine or press by means of which this invention may be carried out, a portion of the lower part of the press being omitted.

Figure 2 is a side elevation of Figure 1.

Figure 3 is a detail sectional view taken on line 3—3 Figure 1 on an enlarged scale, and showing some of the parts in elevation.

Figure 4 is a detail sectional view on an enlarged scale, taken on line 4—4 Figure 1 and showing the portion of the mechanism which is disposed below the bed of the machine.

Figure 5 is a view similar to Figure 3 with parts omitted and on an enlarged scale, showing some of the parts in a different position.

Figure 6 is a view similar to Figure 3 with parts omitted, and with the filler member that is to be inserted between the ram and platen, in an inoperative position and with the ejecting mechanism in operative position.

Figure 7 is a detail view partly in plan and partly broken away and as taken on line 7—7 Figure 6.

Figure 9 is an enlarged detail sectional view of one form of mold embodying a supplementary chamber for the material and the means for ejecting the supplementary supply into the mold chamber.

Figure 10 is a front elevation of one form of mechanism for locking the mold sections together.

Figure 11 is a sectional view taken on line 11—11 Figure 10.

Figures 14, 15, 16, 17, 18, 19 and 20 are detail views partly in elevation and partly in section of valve mechanisms employed in this system.

Figure 8:
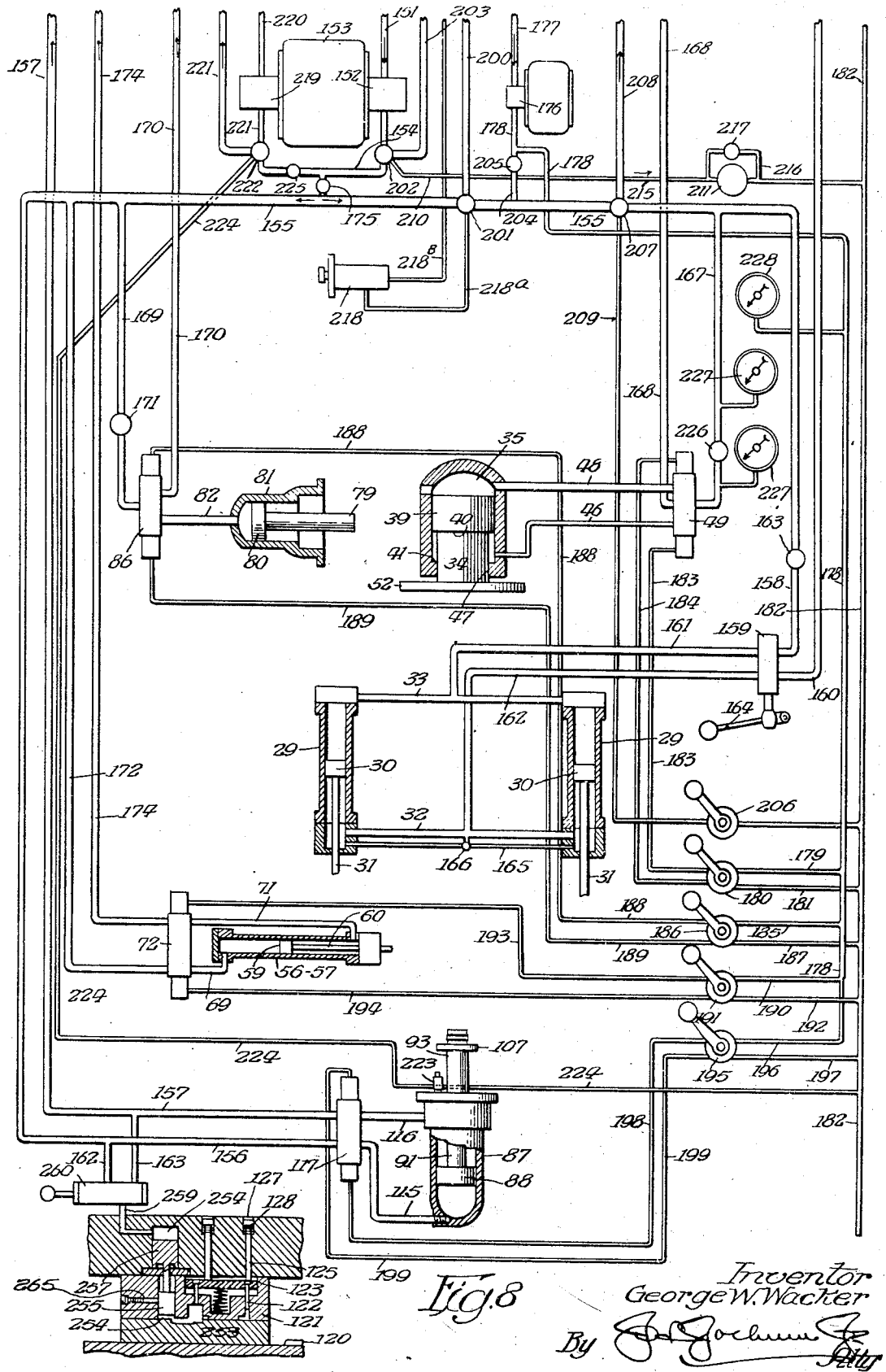
Figure 8 is a diagrammatic view of the fluid or hydraulic system.

The press consists essentially of a bed 20 which may be mounted upon a suitable base 21, uprights 22 and a crown 23, constructed in any desired or suitable manner either integrally or of a sectional construction and if of a sectional construction the parts may be fastened or secured together in any desired manner or by means of tie rods.

Reciprocable between the uprights is a platen 24 and the ends of the platen preferably project between and beyond cooperating uprights 22, as shown more clearly in Figure 1. The platen may be guided in its reciprocating movement in any suitable manner such as by means of depending guide members 25 that are secured to the platen preferably beyond the uprights 22 and pass through guides 26 secured to the bed 20.

If desired, additional guides 27 may be provided which extend above the platen beyond the uprights 22 and project thereabove so as to move through suitable guideways, which latter may be a portion of brackets 28 secured to the crown 23.

The platen is raised or lowered or given a reciprocating movement through the medium of fluid operating mechanism such as cylinders 29 that are supported by the crown 23 and in which cylinders (see also Figure 8) pistons 30 reciprocate, the pistons being connected respectively by means of rods 31 with the platen 24, in any suitable manner.

Fluid pressure is admitted into the cylinders 29, in a manner to be hereinafter described, by means of pipes 32 which enter the bottom of the cylinders beneath the piston 30 so as to raise the platen and by means of pipes 33 above the pistons to lower the platen, the fluid pressure being supplied from a suitable source and being controlled in its direction of flow by suitable valves, all of which later will be described.

Arranged above the bed 20 is a ram 34 (see particularly Figures 3 and 5) which operates in a cylinder 35 in the crown 23. The cylinder 35 is open at its bottom and is closed by means of a gland or annular member 36 which projects into a recess 37 preferably formed as an enlargement of the cylinder 35, and is held in position in any suitable manner such as by means of screws or bolts 38.

The portion 39 of the ram 34 within the cylinder 35 is of a diameter slightly larger than the diameter of the portion which passes through the gland or annular member 36 so as to form a circumferential shoulder 40 which is adapted, when the piston reaches a predetermined point in its lowering movement to contact with the end 41 of the gland or annular member 36 and thereby serves as a stop for limiting the movement of the ram in a downward direction.

Suitable packing 42 and a packing gland 43 may be provided to form a fluid tight joint for the ram and the packing gland 43 is held in position by means of the usual bolts 44.

If desired, the periphery of the gland 36 may be provided with a shoulder 45 to form an abutment for the gland.

The ram is raised in the cylinder 35 by fluid pressure admitted from a suitable source through a pipe 46 and through the inlet 47, and the fluid pressure is admitted to the other side of the ram through a passage 48, a control valve 49 being provided to control the direction of flow of the fluid.

The ram 34 is adapted for a comparatively short extent of movement while the platen 24 is adapted for a comparatively long extent of movement, and the extent of lowering movement of the ram with respect to the extent of the lowering movement of the platen is such that when the platen is at the end of its stroke, and the ram at the limit of its throw, the ram will be spaced a considerable distance above the platen.

Therefore in order that the pressure of the ram will operate upon the platen when the latter is in its lowermost position, a filler member 50 is provided which is adapted to be moved into and out of the space between the ram and the platen.

This filler member may be of any desired or suitable construction and is adapted to be moved in guideways 51 formed in a member 52 which latter is secured in any desired or suitable manner such as by means of bolts 53 (see Figs. 1 and 3) to the end of the ram 34. The member 52 is of a considerable length, and the filler member may be provided with ears or projections 54 that move in the guideways.

This filler member 50 is of such a size that when the platen is in its lowermost position, and the ram is in its elevated position, the filler member may be moved into the space between the platen and ram, so that when the ram is then lowered the force of the ram will be exerted upon the platen through the medium of the filler member to hold the platen against raising movement, which raising movement would result from pressure beneath the platen.

The pressures exerted in the cylinders 29 to lower the platen is not sufficient to hold the platen against rising movement under pressure under predetermined conditions and therefore the pressure of the ram augments the pressure upon the platen to hold the platen against rising movement.

The member 52 may, if desired, be provided with a projecting portion 54ᵃ (see particularly Fig. 3) which enters a recess 55ᵃ in the end of the member 34 and this assists in holding the member 52 in position and will relieve the bolts of lateral stress.

The filler member 50 may be moved into and out of position with respect to the ram 34 in any desired or suitable manner. A simple and efficient means for accomplishing this result embodies a cylinder and piston element, and in order to provide a means whereby the extent of movement of the filler member may be accomplished, without unduly extending the length of the cylinder, there may be provided a tubular member 56 (see particularly Figure 6) within which there is provided another tubular member 57 of a considerably smaller external diameter to provide an annular space 58 between the two tubular members. The spacing of these tubular members may be accomplished in any suitable manner. Within the inner tubular member is arranged a piston 59 to which is connected a piston rod 60 to the forward end of which rod is connected, as at 61, a cap 62, suitable packing 63 being provided to form a fluid tight joint between the piston rod and the end 64 of the inner tubular member 57. This end member 64 may be removably secured to the end of the tubular member 57 by means of suitable bolts 65 and the inner tubular member may be provided with a shoulder 66 which abuts the end 67 of the outer tubular member 56. An opening 68 is provided in the end of the inner tubular member 57 to which opening a pipe 69 is connected through which fluid pressure from a suitable source of supply is admitted into the cylinder formed by the tubular member 57 on one side of the piston 59.

Openings 70 are provided in the wall of the inner tubular member or cylinder 57 adjacent the opposite end thereof to form communication between the tubular member 57 and the tubular member 56 so that fluid entering into the space 58 between these tubular members 56 and 57 will flow through the openings 70 to the opposite side of the piston 59 to move it in the opposite direction.

A pipe 71 has communication with the space 58 between the tubular members so that when fluid pressure is admitted into the pipe 71 (see particularly Figure 6) it will flow through the space 58 in the direction of the arrows, thence through the opening 70 into the tubular member 57 to operate on the piston 59 and move it in the opposite direction. Fluid which is in the tubular member 57 will then be forced out through the pipe 69. When the direction of flow of fluid is reversed, that is, when the fluid is admitted through the pipe 69 to move the piston in a forward direction, the direction of flow above described will be reversed and the fluid will pass out of the cylinder or tubular member 57 through the opening 70 thence through the space 58 and out through the pipe 71. The direction of flow of the fluid is controlled by means of a control valve 72 (see Figure 8) the specific construction of which will be later described.

The cap member 62 is secured to the filler member 50 by means of suitable fastening bolts 73 that pass through a flange 74 on the cap so that when the piston 59 is moved forwardly, that is, toward the right from the position shown in Figure 6 to the position shown in Figure 3 of the drawings, the filler member will be positioned between the ram 34 and the platen 24. The cylinders are secured in position and are supported by the member 52 that is secured to the ram 34 in any desired or suitable manner such as a bar or member 75 which is connected to the end of the cylinder, and project beyond opposite sides thereof. Supporting or anchoring bars or rods 76 are secured to the member 52 and also at 77 to the member 75 so that the cylinders 56—57 will be raised and lowered with the ram. The filler member is provided with an opening 78 therethrough into which the forward end of the cylinder 56 projects. It will therefore be manifest that by manipulation of the piston 59 the filler member 50 may be moved forwardly or backwardly, sliding in the guideways 51 so as to position it between the ram and the platen or to move it out of such position, and the operation or manipulation of this filler member 50 is controlled by the operation of the valve 72.

In order to increase the pressure of the ram upon the platen when the filler member 50 is in position between the platen and the ram so as to overcome or resist the tendency of excessive pressure beneath the platen to raise the latter, and to a pressure beyond the line pressure or the operating pressure within the cylinder 35, means are provided whereby the pressure in the cylinder 35 may be increased. To that end there may be provided a plunger 79 (see particularly Figures 3 and 5), which is arranged preferably adjacent the upper end of the cylinder 35 to operate in a plane transverse to the plane of the vertical movement of the ram 34. This plunger is preferably connected to a piston 80 which operates in a cylinder 81 suitably supported, and fluid pressure is supplied through a pipe 82 to the cylinder so as to move the plunger 79 forwardly and project the same into the cylinder 35 beyond the end of the ram, thereby reducing the volumetric area of the cylinder with the result that an additional pressure will be imparted to the fluid therein. Suitable packing 83 may be provided for the plunger 79.

In order to prevent interference of the ram 34 with the operation of the plunger 79, there may be provided a projection 84 on the end of the ram which, when the ram is at the limit of its uppermost movement engages a projection or shoulder 85 on the interior surface of the wall, thereby providing a space into which the plunger 79 may be forced. The flow of fluid pressure into and out of the cylinder 81 is controlled by means of a control valve 86 similar to the valves 72 and 49 and is adapted to be operated to direct the fluid pressure into the cylinder 81 and to permit the fluid to flow out of the cylinder 81 when the ram 34 rises, as the fluid in the cylinder 35 above the ram will operate upon the end of the plunger 79 and when this pressure overcomes the pressure on the opposite side of the piston 80 the plunger 79 will be moved backwardly and out of the cylinder 35.

Below the bed 20 of the press is arranged a cylinder 87 in which operates a piston 88. The cylinder 87 is supported beneath the bed 20 of the press in any suitable manner, such as by means of a cylinder head 89 being secured by means of fastening bolts 90 to the bed. Connected to the piston 88 is a piston rod 91 that extends through a stuffing box 92 and to the end of the piston rod is connected a plunger 93 by means of a suitable coupling 94, the rod and plunger being preferably arranged in alinement.

The bed 20 of the press has provided therein an opening 95 which preferably increases in diameter from the top to the bottom of the bed so as to form a conical space 96 which communicates or forms the end of a chamber 97. Adjacent the bottom of the chamber 97 is an inwardly projecting annular flange 98 upon which a resilient annular packing member 99 rests, the opening in the packing registering with the opening in the flange.

A bearing member 100 is provided with a circumferential peripheral flange 101 which latter, when the end of the bearing 100 projects through the registering openings in the element 99 and flange 98, will rest upon the resilient element 99. The external diameter of the bearing 100 above the flange 101 is considerably less than the internal diameter of the chamber 97 and this member is of a length to terminate considerably short of the upper end of the chamber.

Resting upon the top of the bearing 100 and preferably in a recess 102 is a tubular member 103, the latter being provided with a flange 104 at the base thereof to enter the said recess 102. This tubular member 103 constitutes what will hereinafter be designated as an injection chamber and encompassing the injection chamber is a collar 105 which serves as a means to reinforce the member 103 against bursting, and encompassing the member 105 is another member 106 which latter may be provided with suitable openings through which a heating or cooling medium may be circulated if desired, or, if desired, heating means may be provided in lieu of the openings. This heating means is provided so as to maintain the injection chamber only at a sufficient temperature to prevent chilling of the material to be operated upon and which is contained within the chamber and to prevent a dissipation of the heat from the material throughout the machine.

Connected to the piston 91 preferably below the coupling 94 is a disc or member 107 and passing through this member 107 are any desired number of rods or pins 108 which have attached thereto and beneath the member 107 a nut or collar 109, the rods 108 being adapted to slide freely through the member 107. These rods pass loosely through the flange 98 and also through the resilient packing 99 being anchored at their free ends, as at 109ª to the bearing 100 by being threaded into the flange 101.

The upper end of the injection chamber 103 is disposed in alinement with the opening 95 and the open end of the injection chamber is less than the diameter of the opening 95 and the normal tendency of the resilient element 99 is to move the end of the injection chamber toward the opening 95, when the piston 88 is raised.

When, however, the piston 88 is lowered the resilient member 99 will be placed under compression through the medium of the rods 108 and this will draw the end of the injection chamber away from the bottom of the opening 96 to provide an air circulation space 110 between the end of the injection chamber and the bottom of the opening 96. This is accomplished in the following manner:

Resting upon the bed 20 of the press is a section 111 of a mold which latter is provided with a sprue or runner 112. Extending from the bottom mold section 111 is a projection 113 which is of a diameter to fit within and fill the opening 95. A portion of the projection 113 is reduced as at 114 and the external diameter of the reduced portion 114 is slightly less than the internal open end of the injection chamber 103 so that when the injection chamber is moved toward the bottom of the mold section 111, the reduced portion 114 will enter the injection chamber and form a closure therefor. At the same time the end of the injection chamber will engage the bottom of the extension 95 of the mold to form a closure for such space, thereby obviating the danger of the material which is forced from the injection chamber, of flowing out of the injection chamber to be wasted, but instead will insure that the material will be injected through the sprue 112 and into the mold.

As the piston 88 rises by reason of fluid pressure being forced into the bottom of the cylinder 87 below the piston through the pipe 115, the member 107 carried by the piston will rise and the plunger will also rise within the injection chamber tending to force the material therefrom into the sprue. As the member 107 rises, the tendency of the resilient element 99 is to expand and by expanding will raise the bearing 100 together with the injection chamber 103 to move the end of the latter into engagement with the bottom of the mold section 111. Any fluid in the cylinder 87 on the other side of the piston 88 will be forced out of the pipe 116. The direction of flow of the fluid into and out of the cylinder 87 will be controlled by a valve 117 similar in construction to the valves 49, 72 and 86.

After the molding operation, the direction of flow of fluid is reversed by the valve 117 causing the pressure beneath the piston 88 to be relieved and also causing pressure to be exerted upon the top side of the piston 88. As the piston descends it will draw with it the plunger 93 until the member 107 contacts the ends or collar 109 on the rod 108 where upon further descent of the piston 88 will move the member 107 downwardly causing it to engage the ends or collar 109 to draw the bearing member 100 downwardly against the stress of the resilient element 99, with the result that the air circulation space 110 between the end of the injection chamber 103 and the bottom of the mold section 111 will be re-established.

The chamber 97 may be employed as a container for a cooling liquid, such as water or the like, which may be supplied through a suitable pipe 118 from any suitable source and which pipe has connection with the chamber through a passage 119 that in turn communicates with the chamber 97, an overflow passage 119—a being provided to maintain the desired water level in the chamber 97. Air circulation passages 120 may also be provided in the bed of the press for maintaining the parts cool.

Cooperating with the mold section 111 is another mold section 121 and these mold sections may be of any desired or suitable construction and preferably embody knockout pins 122 with which a knockout plate 123 cooperates, as is usual in molds of this character. The reduced portion 95 of the mold section 111 serves as a means for maintaining the section against displacement with respect to the surface of the bed upon which it rests and the mold sections may be secured together in any desired or well known manner.

The section 121 of the mold is secured in any suitable manner to the platen 24 so as to be raised and lowered by the latter, and thereby separate the mold sections so as to permit the ejection or knockout of the article 124.

The material to be molded is plasticized before it is placed within the injection chamber 103, and in order to accomplish this, it is necessary to raise the mold section 111. This is accomplished because the mold section 111 is attached to the platen 24. In the operation of the machine, an article is molded and the two sections 121 and 111 of the mold are raised by the platen so as to permit the insertion of more material into the injection chamber when the material that formerly was in the injection chamber has been consumed. The raising of the mold section 111 will uncover the opening 95 so that the material may be placed into the injection chamber through this opening. While the new charge of material is being inserted and while the molds are being raised by the platen, the material in the mold will be given an opportunity to set after which the platen is lowered and then the upper section of the mold 121 is raised so as to permit of the operation of the knockout pins 122 to knockout the article from the mold. This is accomplished by means of knockout pin operating mechanism (see particularly Figures 3, 5 and 7). Within the platen 24 is arranged a series of pins 125, any number of which may be provided and which are adapted to be projected below the bottom of the platen. These pins are provided with heads 126 operating in recesses 127 and beneath the heads 126 and within the recesses are springs 128 which tend normally to raise the pins 125 and hold them in inoperative position so that during the ordinary operation of the press and when the filler member 50 is in engagement with the platen to exert pressure on the latter, these pins will be forced upwardly by means of the springs 128 as shown more clearly in Figure 3.

When it is desired to eject or knock out the article 124 from the mold, the ram 34 is raised and the filler member 50 is moved from between the ram and the platen and into an inoperative position by withdrawing the same causing it to slide along the guideways 51 in the member 52. The knockout pin operating mechanism is then placed into position between the ram and the platen. This mechanism embodies a member 129 which is mounted to slide in the guideways 51 in the member 52 and is normally disconnected from the filler member 50.

This member 129 is provided with depending pins or projections 130 one for each of the pins 125 in the platen 24 and is held in an inoperative position and to one side of the machine in any desired or suitable manner, such as by means of a latch or catch 131 which is connected to a shaft 132, the latter being mounted or supported by the member 52. Connected to the shaft 132 is a lever 133 to the ends 134 of which may be attached operating cords or elements 135 so that by rocking the lever 133 the catch 131 will be moved into and out of operative position so as to enter or to be moved out of the opening 136 in a plate or extension 137 that is secured to the member 129 (see also Figure 6).

To move the operating mechanism 129 into position with respect to the platen, there is provided a coupling between the element 62 which is operated by the piston 59 and the member 129 which may be of any desired or suitable construction.

A suitable construction, however, embodies a headed pin or extension 138 (see Figures 5 and 6) that is adapted to enter a socket 139 carried by the member 129. This socket may be of any construction but may embody spring controlled pins or balls adapted to be projected under the head of the pin 138 when the latter is seated in the socket 139. The stress of the springs is sufficient to cause the member 129 to be locked to the element 62, so as to be drawn into position between the plunger and the platen when the catch 131 is inoperative.

When, however, the member 129 is moved out of operating position between the ram and the platen and when the catch 131 again enters the opening 136 in the plate 137 to hold the member 129 against movement with the element 62, the coupling 138—139 will yield and the member 129 will be held in an inoperative position while the element 62 and the filler member 50 are retracted.

When the parts are in the position shown in Figure 6, that is, when the member 129 and the operating pins 130 are in alinement with the ejector or knockout pin mechanism 125, and when the platen is raised to raise the upper section 121 of the mold, the pins 130 will operate upon the pins 125 to cause them to project beneath the platen and force downwardly the plate 123 to which the pins 122 are attached thereby knocking out the article as shown more clearly in Figure 6 of the drawings.

As means for holding the catch 131 in either of its positions there may be provided a spring controlled pin 140 which is adapted to enter one of the recesses 141 in an arm or extension 142 carried by the lever 133 as shown more clearly in Figures 2 and 5. If desired, any suitable means may be provided for cooling the mold sections 111 and 121 and to that end there is provided in the respective mold sections fluid circulation spaces or passages 143—144 and supported by the platen 24 or the guides 27 are pipes 145 which have communication with the passages in the mold sections. These pipes 145 may be supported by a suitable bracket 146 (see particularly Figure 2) and telescope respectively into tubular members 147, the upper end 148 of which is closed. A pipe 149 is connected to one of these tubular members 147 and a similar pipe 150 is connected to the other of the members 147 so that a cooling fluid may be circulated through the mold by flowing into the pipe 149, thence through one of the tubular members 147, one of the pipes 145, through the passages 143 and thence out through the other pipe 145—147 and out through the pipe 150.

By this arrangement it will be manifest that rigid pipes may be employed in lieu of flexible hose as the reciprocation of the platen will not interfere with these pipes, the pipes 145 being movable into and out of the pipes 147 respectively as the platen 24 is raised or lowered.

The fluid for the system is supplied from any suitable source through a pipe 151, reference being had particularly to the diagram in Figure 8, which pipe is connected with a pump 152 that in turn is operated by a motor 153. Leading from the pump 152 is a pipe 154 which has connection with a pipe 155 the latter in turn being connected by means of branches through the medium of pipes 156—157 with the 4-way valve 117 which latter controls the direction of flow of the fluid with respect to the piston 88.

This pipe 155 is connected by means of a pipe 158 with one side of a manually controlled valve 159 and connected also to the valve 159 is an exhaust or outlet pipe 160. A pipe 161 leads from the casing of the valve 159 and communicates with the pipe 33 which in turn has communication with the platen, raising and lowering the cylinders 29 on one side of the piston 30. The valve 159 also has communication by means of a pipe 162 which in turn has communication with the pipe 32 leading to the cylinders 29 on the other side of the piston 30 and in the pipe 158 may be provided a globe valve 163. The valve 159 is manually operated in any suitable manner such as by means of an operating lever or handle 164. This valve will be specifically described later.

Both of the pipes 161—162 serve as fluid inlet and fluid outlet pipes for the cylinders 29. That is, when the valve 159 is set so as to direct the fluid into the cylinder 29 on one side of the piston the fluid on the other side of the piston will flow out through the pipe 32, pipe 162, through the valve 159 and into the exhaust pipe 160. When the valve 159 is reversed, the direction of flow of the fluid will also be reversed.

As a means for preventing a sudden blow of the platen 24 against the mold when the platen is lowered, cushion means is provided in the cylinders 29 and comprises a pipe 165 of a very small diameter which leads from the end of the cylinders below the piston 30 and has communication with the pipe 162 by means of a valve 166. This valve 166 may be of any desired or suitable construction such as an ordinary open and shut valve that is adapted to be opened to any degree or extent so as to control the size of the passage through which the fluid, being forced out of the cylinders 29, will flow back into the pipe 162. It will therefore be manifest that inasmuch as the pipe 165 is of a smaller diameter and when the fluid is trapped between the piston and the end of the cylinder, it will flow solely through the pipe 165 and thereby form a cushion.

The pipe 32 has communication with the cylinder 29 at a higher elevation than the point at which the pipe 165 has communication with the cylinder and it will be seen that during the first part of the descent of the piston 30 in the cylinder 29, fluid will be forced out through the pipe 32 but, when the piston 30 assumes a position to close the pipe 32 and the corresponding opening in the cylinder 29, the only escape for the fluid will be through the pipe 165 and as this pipe is of a comparatively small diameter with respect to the pipe 32 the escape of the fluid will be greatly retarded.

The pipe 155 also has communication with another pipe 167 that leads to the valve 49, the specific construction of which will be later described, but is preferably of the 4-way type and is the valve which controls the flow of fluid through the pipes 46—48 of the ram 34. The casing of the valve 49 is also connected to an exhaust pipe 168.

Similarly the pipe 155 is connected by means of a branch 169 with the valve 86 which controls the admission of the fluid operating pressure to the cylinder 81 that actuates the plunger 79 which operates to intensity the pressure of the fluid in the cylinder 35, as will be later described, and within this pipe 169 may be arranged a check valve 171. Leading from the casing of the valve 86 is an exhaust pipe 170.

Leading from the pipe 155 is another pipe 172 which has communication with the valve mechanism 72, the latter operating to control the direction of flow of the fluid through the pipes 69—71 for moving the filler member 50 into and out of position between the ram and the platen, and leading from the casing of the valve 72 is a discharge outlet pipe 174.

Thus it will be seen that the pump 152 receiving its supply of fluid through the pipe 151 will direct the same through the pipe 154 and into the pipe 155 to be distributed to the various mechanisms, a check valve 175 being provided between the pipes 154 and 155.

The pump 152 is a continuously operating pump and will establish and maintain a pressure in the line through the pipe 155 and by controlling the respective valves 49—72—86 and 117 the direction of flow of the fluid will be controlled to move the respective parts accordingly, the raising and lowering movement of the platen being controlled by the valve 159.

The valves 49—72—86 and 117 are fluid actuated valves and pressure is supplied to actuate these valves by means of a pump 176 which receives its supply through a pipe 177 leading from the source of supply. The pump discharges into a pipe 178 and this pipe with the branches which are attached thereto are of a smaller diameter than the diameter of the pipe 155 with the various pipes attached to the latter and in the description of the pipe 178 and its communicating pipes which convey the fluid pressure to the valves to operate them will hereinafter be designated as the pilot pipes or pilot system. This pilot pipe 178 has communication with a pipe 179 with a manually operated valve 180 and leading from the casing of the valve 180 is a pipe 181 which connects with an exhaust pipe 182. Leading also from the valve casing 180 is a pilot pipe 183 which has communication with the casing of the valve 49 and a second pilot pipe 184 also has communication with the casing of the valve 49, and the valve 180, so that by manipulating the valve 180 the direction of flow of the fluid through the pilot line to the valve 49 will be controlled and thereby the raising and lowering movement of the piston 39 in the cylinder 35 which controls the movement of the ram will be controlled.

Similarly leading from the pipe 178 is another pipe 185 which connects to the casing of a valve 186 and leading from the valve 186 is another pipe 187 which communicates with the exhaust pipe 182. The valve 186 is manually controllable and leading from the valve 186 is a pipe 188 which has communication with the valve 86 and another pipe 189 also has communication with the valve 186 and the valve 86 so that by positioning the valve 186 in one position, fluid pressure from the pipe 169 will enter the cylinder 81 to advance the piston 80 and the plunger 79 to force the latter into the cylinder 35 and thereby intensify or increase the fluid pressure in the cylinder 35 against the piston 39.

When the valve 186 is set to exhaust the fluid pressure from the cylinder 81, the pressure in the cylinder 35 will operate upon the end of the plunger 79 to force the piston 80 backwardly in the cylinder 81 so that the fluid in the cylinder 81 behind the piston will flow through the valve 86, thence through the pipe 170 back to the exhaust or tank. Still another pipe 190 forms communication between the pipe 178 and a valve casing 191, the latter having a valve therein which is preferably manually operated and a pipe 192 forms communication between the valve casing 191 and the exhaust pipe 182.

Leading also from the valve casing 191 is a pipe 193 which has communication with the casing of the valve 72 and another pipe 194 forms communication between the casing of the valve 72 and the casing of the valve 191 with the result that when the valve 191 is set so as to direct the fluid pressure from the pilot system through the pipe 193 and the valve 73 is moved in one direction, the piston 59 will be correspondingly moved by the advance of fluid pressure from the pipe 172, and at the same time the fluid pressure on the other side of the piston will flow out of the cylinder through the pipe 69, to the exhaust through the pipe 174. The exhaust from the pilot system will flow from the valve casing 72, pipe 194, through the valve 191, pipe 192, to the exhaust pipe 182.

The action of the injection plunger is also controlled by the valve 195 which is also preferably a manually operated valve, the casing of which has communication by means of the pipe 196 with the pilot pipe 178 and has communication by means of a pipe 197 with the exhaust pipe 182. Leading from the valve casing 195 is a pipe 198 which has communication with the casing of the valve 117 and a pipe 199 also has communication with the valve 117 and the valve casing 195, so that when the valve 195 is set to direct the fluid pressure beneath the piston 88 to raise the injection plunger, the fluid pressure to operate the valve will be from the pilot pipe 178, through the pipe 196, valve 195, pipe 198, to the valve 117. The fluid pressure to the cylinder 87 will then be through the pipe 115 beneath the piston 88. At the same time fluid on the other side of the piston 88 will be exhausted from the cylinders 87 through the pipe 116, valve 117 to the exhaust pipe 157.

Thus it will be seen that by manipulating the various valves 180—186 and 191 as well as the valve 164, the operation of the various parts of the press may be controlled.

The pipe 155 also has communication with a discharge or outlet pipe 200 and in the operation of the pump 152 to build up the necessary pressure in the system such pressure is controlled by means of the necessary pressure regulating valve 201 in the pipe 155 and this pressure regulating valve 201 will also operate as a relief valve.

When the part of the mechanism to which the pressure is applied (such as the slide) reaches the limit of its movement or meets with sufficient resistance, then no more fluid in volume can be supplied to the operating parts, but the pump 152 will still be operating, and by attempting to force more fluid into the system, the relief valve 201 will open to handle the surplus fluid and the pump 152 will then operate to discharge the fluid at full pressure back to the tank or source of supply through the pipe 154, past the valve 175, through the valve 201 and out through the pipe 200 back to the tank or source of supply.

However, such a condition will result in the loss of power and in order to obviate such loss a supplemental relief valve 202 is provided in the pipe 154 and connected also to the casing of the valve 202 is an exhaust pipe 203.

This valve 202 is operated at a predetermined time in the operation of the mechanism and the means for controlling the operation of this valve 202 operates to automatically open the valve, with the result that the fluid at low pressure will be discharged from the pump 152 through the pipe 154, past the valve 202 into the pipe 203 and back to the tank or source of supply.

However, at this time and although the fluid is being discharged back into the tank or source of supply by pump 152, it is necessary to maintain the predetermined fluid pressure within the system and against the actuated parts, that is, such as against the slides, etc. This may be accomplished by the use of the pump 176, which is preferably of a smaller capacity and connected with the system so as to supply the necessary fluid to maintain such pressure, such connection being made by means of a pipe 204 which has communication with the pipe 178 and in which pipe 204 is arranged the necessary control valve 205. The output of the pump 176 is prevented from discharging through the main pump 152 by means of the check valve 175. This pump 176 directs fluid through the pilot system 178 and the direction of flow in this pilot system is controlled by the manually operated valves 186—180—191 and 195 so as to direct the fluid to one side or the other of the respective 4-way valves 49, 73, 86 and 117 to cause a change in the direction of flow of the fluid to one side or the other of the respective operating pistons.

The valve 205 will not open to permit fluid to be supplied to the system by the pump 176 until the pressure from the pump 176 exceeds the pressure in the system at any time.

Another valve 206 controls the operation of a valve 207 in the pipe 155 and which valve 207 controls the inlet of the fluid pressure into an exhaust pipe 208, and which valve 207 is opened to permit a sudden discharge of the fluid pressure from the system back into the tank or source of supply through the pipe 208.

This is sometimes necessary or desirable to temporarily render the machine inoperative.

The valve 207 is opened to permit such discharge of fluid by actuating the valve 206 and the opening of the valve 207 is accomplished by venting the valve 207 through the pipe 209.

A vent line 210 normally maintains the valve 202 in a position that the pump 152 will cause fluid to flow therethrough into the system and is operated so as to be positioned to cut out the supply of the fluid from the pump 152 with respect to the system and cause the fluid circulated thereby to flow back to the supply through the pipe 203.

The valve 202 is operated at a predetermined time in the operation of the system, automatically, and in any desired or suitable manner, preferably by means of a valve operating mechanism 211 (see Figures 8 and 15) which in turn is controlled in its operation by the fluid pressure in the system and which controls an electro-responsive device 212 (see Figure 15) controlled by a clock mechanism 213 which operates a valve 214 to permit fluid pressure to unbalance the valve 202, the valve 214 controlling the fluid pressure in the pipe 215.

The timer 213 is initially set to operate at a predetermined time after the commencement of any sequence in the operation of the mechanism.

There may be times when it is desired to maintain the valve 202 open for a prolonged period and to that end there is provided a by-pass 216 preferably manually controlled by a valve 217, bypassing the fluid around the valve 214 and the by-pass 216 and the valve 217 may be an ordinary valve to open and close the by-pass.

A manually operated pressure regulator 218 is provided for remote control of the pressure through the valve 201, one side of the latter being connected with the valve 218 by a pipe 218—a and the other side of the valve 218 is connected with an exhaust pipe 218—b so that by operating the valve 218 the pressure in the system which it is necessary to maintain may be increased or decreased. That is, the pressure necessary to operate the valve 201 may be varied at will.

Another pump 219 operates to normally by-pass fluid from the supply pipe 220 back to the supply through the pipe 221 and this circulation is controlled by a valve 222 being opened, and the opening of this valve is accomplished by unbalancing the fluid pressure which operates it by reason of a valve 223 being opened and which valve is controlled by the operation of the piston 88 and the piston rod 91. The element 109 carried by the piston rod 91 when the piston 88 is lowered operating to open the valve 223. This valve controls the venting line 224 which communicates with the casing of the valve 222 and the exhaust pipe 182.

This valve 223 may be of any desired construction but is preferably an ordinary open and shut valve. When this valve 222 is opened, pressure is exhausted through the pipe 221. When the injection plunger 93 and the piston 88 move upwardly to permit the valve 223 to close, the valve 222 will be positioned so that an extra volume of fluid will be supplied to the cylinder 87 through the line 155 for rapid injection of the material from the injection cylinder and into the mold.

A check valve 225 is provided in the pipe 154 between the pump 219 and the line 155, and a check valve 226 may also be provided in the pipe 167. Pressure gauges 227 may also be provided in the line 167 on both sides of the valve 226 so as to indicate different pressures, while a pressure gauge 228 may also be provided in the pilot line 178.

Obviously check and relief valves may be provided at any desired or necessary points in either of the systems.

Any suitable means may be provided for locking the upper section 121 of the mold to the platen 24, such as L-shaped clamps 229 which are held in position by means of fastening bolts 230 which pass therethrough and enter the platen. The ends of these clamps project into recesses 231 in the mold section 121.

In order to position the upper mold section with respect to the lower mold section, guide pins 232, any number of which may be provided, are secured to the lower section 111 of the mold. These guide pins are adapted to enter suitable openings 233 in the upper mold section 121. As an additional means for securing the lower mold section 111 against displacement with respect to the bed 20 one or more positioning or locating blocks 234 may be provided which may be secured to the bed preferably by means of the fastening bolt 235 and contact the edge of the mold section 111.

The lower mold section 111 is provided with open recesses 236 and secured to the upper mold section 121 are L-shaped members 237, the ends 238 of which project into the recesses 236 and the recesses are of a height considerably greater than the vertical dimension of the L-shaped portion 238 of the respective members 237.

Springs 239, any number of which may be provided, are respectively seated in recesses 240 in the lower mold section 111 and contact the end of the respective L-shaped members 237, the latter being secured to the upper mold section in any suitable manner such as by means of fastening bolts 241. The tendency of these springs 239 is to move the mold section 121 away from the section 111 and in order to hold the mold section 121 in contact with the mold section 111, any suitable means may be employed, such as a slidable member 242 which is held in position preferably by means of the screw 243 passing through a slot 244. The forward end of this member is beveled, as at 245, and connected to the member intermediate its ends, as at 246, is a lever 247 the lower end of which is pivotally connected, as at 248, to a link 249 which in turn is pivotally connected, as at 250, to the lower mold section 111.

With this construction and with the parts in the position shown in full lines in Figure 10 the wedge shaped portion 245 of the member 244 will be forced between the extremity 238 of the member 237 and the upper wall 251 of the recess 236 to draw the upper mold section 121 against the lower mold section 111 at the same time compressing the springs 239. When the lever 247 is moved to the position shown in dotted lines in the said figure, then the beveled or tapered extremity 245 of the member 242 will be withdrawn to unlock the mold sections with the result that the stress of the springs 239 will tend to slightly separate the mold sections. When the mold section 121 is unlocked with respect to the mold section 111 and by reason of the clamps 229 which secures the mold section 121 to the platen 24, the mold section 121 will be raised with the platen to permit ejection of the article from the mold. When, however, the upper mold section 121 is locked to the lower mold section 111 through the medium of the member 242, the lower mold section will also be raised with the platen so as to uncover the ejection chamber 103 to permit insertion of a supply of material and to permit free and unobstructed access to the interior of the chamber 103.

In order to compensate for any shrinkage of the material in the mold and to provide a means whereby an excess supply of material may be delivered to the mold to be subsequently injected into the mold with the material previously delivered into the mold, any suitable means may be provided and to that end the mold cavity 252 (see particularly Figure 9) has communication through a passage 253 to a reservoir chamber 254 in which latter is arranged a plunger 255 which substantially fills the chamber. Connected to the plunger 255 is a piston rod 256 which in turn is connected to a piston 257 that operates in a chamber or cylinder 258. This chamber 258 is connected by means of a passage or pipe 259 to a valve casing 260 in which is arranged a manually operated valve 261. This valve is of such a construction that when it is in the position shown in Figure 9, it will form a communication between the pipe 259 and a pipe 262 which in turn is connected with the fluid pressure circuit.

Leading also from the valve casing 261 is an exhaust pipe 263. The valve is of such a construction, as before stated, that when in the position shown in Figure 9 fluid under pressure may be admitted into the cylinder 258. When, however, the valve 261 is moved to close the pipe 262 with respect to the pipe 259, the portion 264 of the valve will assume a position as to close the connection between the valve casing and the pipe 262 thereby opening the exhaust pipe 263 into communication with the pipe 259 so that when the material is forced into the mold chamber 252 and also into the chamber 254 the plunger 255 will be raised.

When the parts are in the position shown in Figure 9 and after the material has been supplied to mold under pressure and before the article in the chamber 252 has been completely formed, in order to compensate for the shrinkage and to insure a proper density of the article, fluid pressure will be admitted through the pipe 262 past the valve 261 through the pipe 259, thence into the cylinder 258 to operate against the piston 257 which will in turn, through the medium of the piston 256, force the plunger 255 downwardly to eject the material from the cylinder 254 into the mold chamber 252.

If desired and in order to maintain the plunger 255 elevated, a spring controlled pin or member 265 may be provided to frictionally engage the plunger 255 when the latter is raised.

It may sometimes be desired to perform the operation of shaping the articles in the dies or molds by a 2-step pressure method and to that end means may be provided for successively arresting the platen 24 in its movement toward the bed 20. To that end there may be provided steps or anvils 266 (see particularly Figures 12 and 13) which are adapted to engage and rest upon the bed 20 and may be of any desired height according to the point at which it is desired to arrest the movement of the upper mold 121 in its direction of movement toward the lower mold 111. Secured to the lower face of the platen 24 is a member 267 one for each of the anvils 266 and this member 267 is provided with a stepped portion 268 in its lower face.

Figure 12:
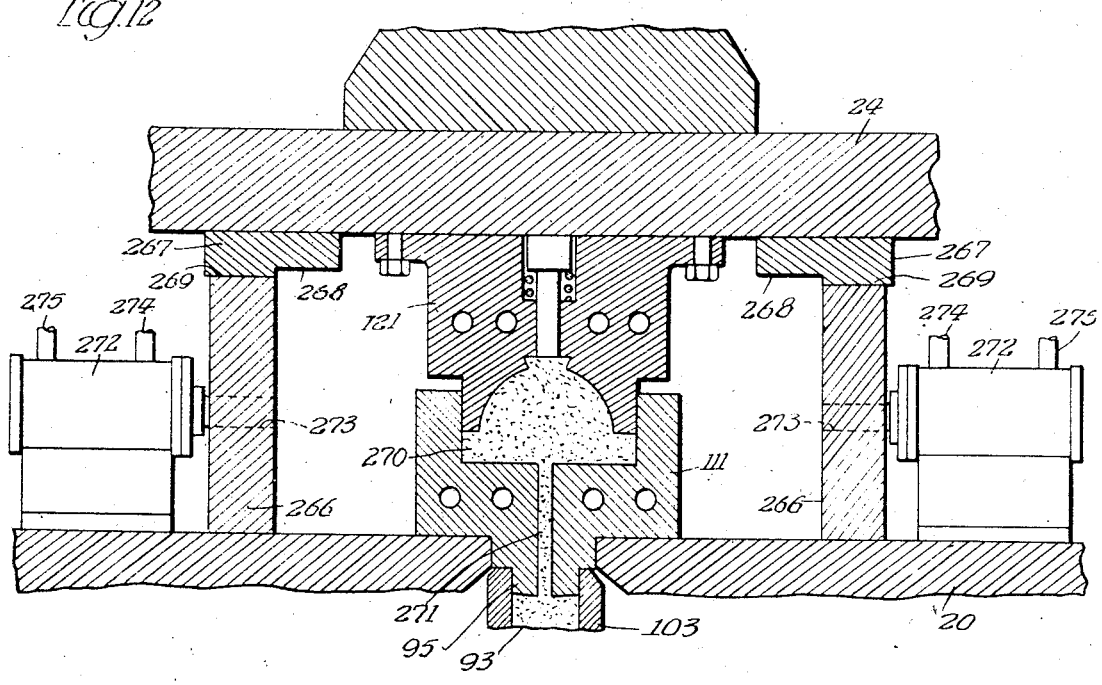
Figure 12 is a sectional view of one form of mold and the means for arresting the movement of one section towards the other.
Figure 13:
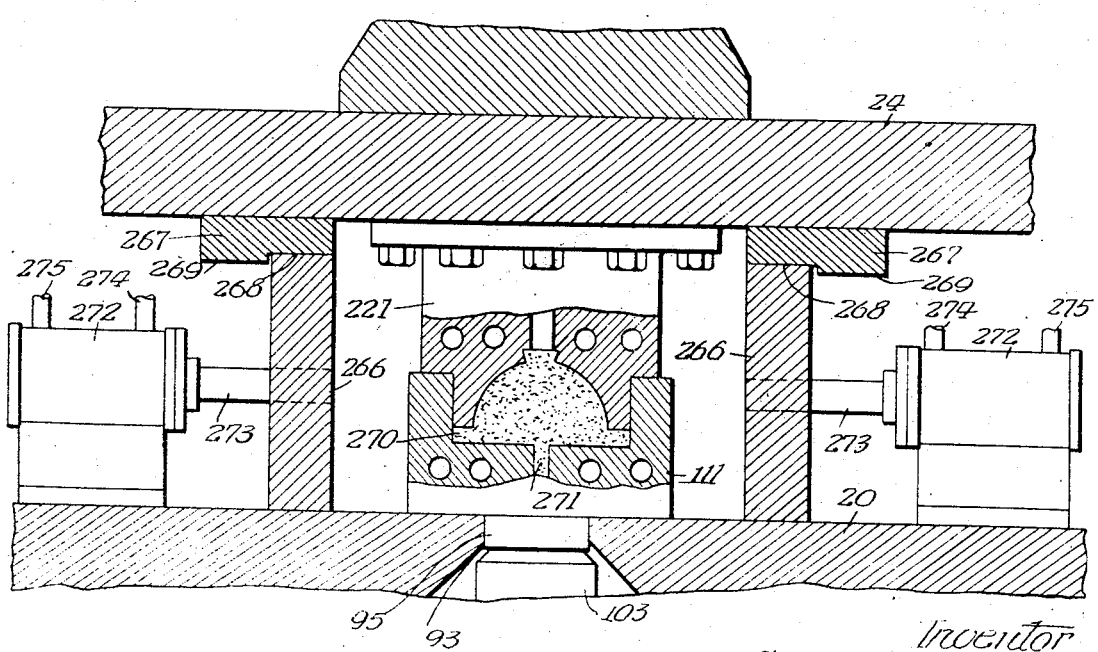
Figure 13 is a view similar to Figure 12 showing the parts in different positions.

When the parts are in the position shown in Figure 12, the portions 269 of the members 261 will engage and rest upon the anvils or steps 266 and the upper mold will be arrested in its movement toward the lower mold 111 but in such position as to close the mold chamber 270 so that the material may be forced through the sprue 271. These anvils will also serve to prevent the pressure exerted upon the platen 24 from crushing or injuring the molds.

After the material has been forced into the mold chamber 270 and after the material in the sprue has become set, the anvils 266 may be moved towards each other to position them so that the platen 24 and the upper mold section 121 may be further lowered to compress the material in the mold chamber 270, and the chilled material in the sprue will permit the material in the mold from being forced back through the sprue. That is, so that the upper end of the anvil 266 will be in alinement with the stepped portion 268 of the members 261, as shown more clearly in Figure 13 of the drawings.

At this time the movement of the platen 24 and the upper mold section 121 respectively toward the bed 20 will be arrested and the material in the mold chamber 270 will be further compressed, and the mold sections will be relieved of the excessive pressure of the platen and ram while the latter will be held together with sufficient force as to resist separation of the mold section by internal pressure and the completion of the article will be accomplished by the pressure of the mold sections being forced together.

Any suitable means may be provided for moving the steps or anvils 266, such as a cylinder 272 having a piston operable therein, the piston rod 273 being connected to the anvil 266, fluid pressure being supplied to the cylinder 272 on one side of the piston from any suitable source of supply by means of a pipe 274 supplied to move the piston in one direction, and through the pipe 275 to the other side of the piston to move it in the opposite direction. A suitable control valve of any ordinary and well known construction may be employed for controlling the direction of flow of the fluid with respect to the piston in the cylinder 272 according to the direction of movement which it is desired to impart to the respective anvils or steps 266.

In order, however, to move the steps or anvils 266 the pressure on the platen 24 is relieved thereby permitting the anvils 266 to be properly positioned with respect to the surface 268 and when it is desired to move the anvils 266 back again so as to be in position that the surfaces 269 will contact them, the platen 24 is raised so as to permit the anvil to clear the shoulder formed by the stepped portion 268 of the member 261.

In Figure 19 of the drawings there is shown a simple construction of the valves 180—186—191—195 by means of which the direction of flow of the fluid from the pilot lines to the valves 49—86—72—117 may be controlled. In Figure 17 of the drawings the construction of the valves 49—86—72—117 is shown and each comprises a casing in which the valve 276 proper operates. The valve 276 is provided with a piston 277 on each end thereof movable respectively in cylinders 278. One of the cylinders is connected by means of the pipe 184 to the valve casing 180, while the other of the cylinders 279 is connected by means of the pipe 183 to the valve casing 180 to operate the valve 276, the valve casing 49 being connected with the pipe 48 to the cylinder 35 on one side of the piston 39 and by the pipe 46 to the other side of the piston 39, while the pipe 168 is connected to the valve casing 49 to form an exhaust while the pressure supply pipe 167 is also connected to the valve casing 49, whereby fluid pressure may be admitted into and exhausted from the cylinder 35 as will be understood.

The valve 86 is of a construction similar to the valves 49—72 and 117 (see Figure 17) except that in the case of the valve 86 either the opening 48 or 46 may be plugged so that there will be only three passages leading into and out of the valve casing 86 to which the pipes 82—169 and 170 are respectively connected. A simple construction of the valve 159 is shown in Figure 16 of the drawings and comprises a valve proper 159a reciprocable in the casing 159 by means of the operating handle or lever 164 and this valve 159a controls the ports to which the pipes 161 and 162 through which the fluid is circulated to raise or lower the platen and also controls the connections to which the pipes 158 and 160 are connected that lead respectively from the pressure line 155 and form the exhaust passage 160.

A simple construction of valve 205 is shown in Figure 18 of the drawings and comprises a casing in which a valve proper 277a is reciprocable. The output from the pump 176 flows through the pipe 178 into the valve chamber 278 from the pilot line 178 and the pump is also connected with the main supply 155. Fluid flows through the pipe 178 into the valve chamber 278. The valve 277a is of a sleeve type and a spring 279 operates against it tending to move it in one direction to close the passage 178. The fluid will then flow through a passage 280 in the valve casing to operate upon a plunger 281 to move the valve 277a against the stress of the spring 279. When the piston raises the valve the passage 178 will be opened as well as the pasage 204 so that they communicate and the valve will be counterbalanced. To always maintain the differential pressure between the pressure at the openings 178 and 204 a passage 282 forming a communication between the valve chamber and the passage 204 is provided.

A simple form of combined pressure relief and unloader valve corresponding to the valve 201 is shown more clearly in Figure 14 of the drawings and comprises a valve chamber 283 in which a valve 284 is arranged. The pipe 155 is connected to the openings 155—a in the valve casing 201 while to the opening 200—a is connected the pipe 200, a restricted opening 285 forming communication between the passages 155—a and 200—a controlled by the portion 286 of the valve.

The valve 284 is provided with a bleed passage 287 which forms communication with the passage 155—a and the chamber 283 above the valve and leading from this chamber 283 is a passage 288 controlled by a spring pressed ball valve 289, the tension of which spring may be adjusted by means of the adjusting screw 290.

A spring 291 may also be provided which engages the valve 284 and tends normally to free the valve against its seat to close the passage 285.

Pressure in the line normally flows through the passage 155—a thence through the bleed opening 287 to the chamber 283 on the top side of the valve tending to cause a balanced condition of the valve. However, the spring 291 supplements the pressure on top of the valve to overcome the balance to keep the discharge outlet opening 285—200—a closed. At this time pressure is not sufficient to unseat the ball 289. An increase of pressure upon the fluid through the bleed passage 287 and upon the top of the valve 284 will unseat the ball 289, so that the pressure in the chamber 283 will be limited to a predetermined degree, which degree is controlled by the pressure which seats the ball valve 289.

This will be accomplished because the size of the passage 287 is such that it will not permit fluid to flow therethrough in same quantities as will be discharged or flow past the valve 289. When this condition exists, the valve 284 will be unbalanced and will be raised by the pressure beneath the valve in the passage 155. The fluid which presses the valve 289 when the latter is unseated will flow through the passage 293 to the exhaust passage 200. If it is desired to employ additional means whereby the pressure in the main line 155 may be varied through the medium of this valve, the ball 289 is set to its highest resistance pressure and a supplemental valve similar to the ball valve 289 may be employed and located at any convenient position for the operator. This supplemental valve will control a passage 294 which communicates with the chamber 283 above the valve 284 and eventually leads to the discharge pipe. However, if desired, this valve may be employed to divert the fluid in the pressure line 155 to the discharge 200 to reduce the pressure in the supply line to negligible pressure. The valve to which the passage 294 is connected may itself have a passage whereby it may be placed into a direct communication with the discharge pipe.

Obviously any form of valve mechanism suitable to carrying out the objects and purposes of the invention may be employed and therefore simple constructions of valves by which these ends may be accomplished have been described.

The material to be operated upon and which is ejected from the injection chamber 103 is placed into the chamber in a plasticized condition, that is, the material is preheated and plasticized and the operation of plasticizing the material is not carried on within the machine proper. The mold and the injection chamber may be supplied with heat, that is, they may be heated to a degree of heat which is employed only for the purpose of preventing dissipation of the heat from the plasticized material and not for the purpose of plasticizing it as the plasticization operation is completed entirely externally of the machine.

Furthermore, by having an unobstructed open ended ejection chamber with which the mold chamber in the mold has flow communication through the medium of the sprue, an hydraulic pressure may be maintained on the material in the mold chamber through the material which is in the sprue. The volume of the material in the sprue being considerably less than that in the mold chamber, will become set and become contracted and when the upper section of the mold is raised the portion of the material within the sprue will also be withdrawn therefrom and will be ejected when the portion of the article in the upper section of the mold is ejected by the knockout system.

By reason of the material setting and becoming cool in the sprue, it will be manifest that after the mold chamber has been filled to its capacity it would not be feasible to attempt to force an additional amount of material into the mold chamber to compensate for any shrinkage of the article in the mold and therefore in order to accomplish this result and to overcome the difficulty presented by the cooling of the material in the sprue and the impossibility of forcing additional material into the mold chamber under such conditions, the supplemental or reserve supply chamber 254 with the mechanism for ejecting the material from such chamber has been provided.

It is thought that the operation of the mechanism will be clearly understood from the foregoing description but briefly stated it is as follows:

To make an article which requires the full contents of the container 295 and assuming that the container and contents thereof have been heated to the desired degree, and that the injection chamber 103 into which the container is to be placed has been brought to a temperature only sufficient to keep the heat in the container from being dissipated into the machine, and that the platen 24 is elevated and the injection plunger 93 is in its lowermost position, and the bearing 100 which surrounds the plunger 93 is also down, the end of the injection chamber 103 will be spaced from the bottom of the supporting base 20 of the machine so as to establish the air circulation space between the end of the injection chamber and a portion of the bottom of the lower mold section 111.

The ram 34 as well as the platen 24 will also be raised. The ram and the platen are raised and lowered independently of each other.

With the parts in this position the mold is placed upon the bed of the machine in a closed position. The platen is then lowered until it contacts with the top section of the mold and this section is then fastened to the platen by means of the clamps 229. Then the bottom section of the mold is located upon the bed of the press by means of the clamp block 234.

The knockout pins 122 are in an inoperative position, that is, are withdrawn so that they will be positioned in the mold section 121.

The knockout pin operating mechanism 129 is in a drawn out position to one side of the press so that the pins 130 thereof will be out of alinement with the knockout mechanism in the mold section. The filler member 50 is also positioned out of alignment with the mold.

The press is then ready to be loaded, it of course being understood that the sections of the mold are secured together. The platen 24 with the mold secured thereto is then raised and this will uncover the entrance opening to the injection chamber 103, the press bed having an opening in register with the open end of the injection chamber, so that the preheated material may be placed into the injection chamber 103, the plunger 93 forming the bottom of the injection chamber. The platen 24 is then lowered until the mold rests upon the bed of the machine, the lowering of the platen being effected by means of the cylinder and piston element 29. At this time the pressure in the platen lowering cylinders will assist in holding the mold sections together, and when the platen is at the end of its stroke it will be spaced for a considerable distance below the end of the ram 34. The filler member 50 is then positioned between the ram and the platen, being moved inwardly from the side of the machine.

After the filler member has thus been positioned, the ram is lowered by its own pressure actuated means, until the ram contacts the filler member.

The movement of the ram in either direction is not very great and the supplemental pressure created by the ram on the platen 24 and thence to the mold is for the purpose of overcoming internal pressure in the mold which latter would have a tendency to separate the mold sections and to overcome the pressure in the platen lowering cylinders.

In some cases it is advisable and even necessary to further increase the pressure of the ram against the filler 50 and the platen 24.

To provide for such increase of pressure the plunger 79 is employed which is adapted to be forced into the ram cylinder 35 to further compress the fluid in such cylinder and consequently increase the pressure exerted upon the ram.

At this time the injection plunger 93 and the tubular member 103 forming the injection chamber is in a lowered position. That is, so that the upper end of the injection chamber 103 is spaced below the bottom of the mold to provide an air circulation and heat insulation space.

The injection plunger 93 is thereafter forced upwardly and the injection chamber 103 will also travel upwardly to close such heat insulation space and to prevent the material in the injection chamber from flowing between the end of this chamber and the bottom of the mold and assuring that the material will be forced directly from the chamber through the sprue 112 into the mold chamber 124.

The amount of material in the injection chamber should be more than the amount necessary to fill the mold, including the sprue and the passages, so that when the mold is filled the pressure of the plunger will be exerted directly upon the material thereby maintaining hydro-static pressure through the material.

When the injection plunger 93 starts to move upwardly, the injection chamber 103 will also move upwardly until, as before stated, the end of such chamber contacts the mold and thereby closes the heat insulation space therebetween.

When, however, the end of the injection chamber contacts the press bed or bottom of the mold, its upward movement is arrested but the injection plunger 93 will continue in its upward movement and the material will be injected directly from the injection chamber into the mold. The plunger 93 will be arrested in its upward movement by the material filling the mold and the passages between the mold chamber and the end of the plunger.

At the proper time thereafter, the plunger 93 is then retracted and as it is retracted the end of the injection chamber 103 is pulled away from engagement with the bottom of the mold by means of the rods 108 and the plate or member 107 which latter in its downward movement with respect to the rod 108 will eventually contact the nut or shoulder 109 on the respective rods 108 and will draw the bearing 100 downwardly against the pressure of the resilient member 99, thereby re-establishing the air circulation space between the upper end of the injection chamber 103 and the bottom of the mold. It is of course to be understood that during the rising movement of the plunger 93 and when the end of the injection chamber 103 contacts the bottom of the mold, a further movement of the plunger 93 upwardly will cause the plate or member 107 to slide upon the rods 108.

In instances where undue and objectionable shrinkage is liable to occur in the mold, after injection, provision is made to augment the supply of material to the article in the mold. This is preferably accomplished by providing the excess supply chamber or cylinder 254 into which a portion of the material that is being fed to the mold will pass to be temporarily held therein, the plunger 255 rising to permit of the entrance of the material into the chamber 254, so that as the material is becoming cool or is setting in the mold, this supplemental supply of material may be forced into the article that is within the mold to compensate for any such shrinkage. This is desirable because as the material in the sprue 112 becomes cool it cannot be forced into the mold or into the article which is in the mold.

At the proper and predetermined time the intensifier or booster pressure is relieved, that is, the plunger or piston 79 is withdrawn from the cylinder 35. The ram 34 is then raised and the filler member 50 is withdrawn. The platen 24 with the locked mold attached thereto is raised and during the raising of the mold the article therein is cooling or setting.

After the platen has thus been raised, the injection plunger 93 is raised to eject the slug or material which may remain in the injection chamber, if desired, as well as the collapsed container.

While the platen 24 is thus held in a raised position and free access is had to the injection chamber 103 through the unrestricted open end thereof, another container or cartridge may be placed in the injection chamber 103 for the next operation. The platen 24 and the mold are then lowered until the mold again rests upon the bed of the machine.

The next operation is to position the knockout pin operating mechanism so as to operate the pins 122 to remove the article from the mold. This positioning of the knockout pin operating mechanism 129 may be accomplished in any suitable manner. One means for accomplishing the result is to provide the locking or coupling mechanism 138—139 on the filler member 50 and the supporting structure for the knockout pin operating mechanism 130 so that at a predetermined time in the movement of the filler member 50 into and out of position with respect to the ram 34 the filler member 50 and the knockout pin operating mechanism will be moved into and out of operating position with respect to the ram. That is, they will be alternately moved into and out of operating position when the two are locked together.

The coupling means between the filler member 50 and the knockout pin operating mechanism 129 is releasable and the filler member in its movement in one direction will become locked with the knockout pin operating mechanism so that upon the movement of the filler member in the opposite direction the knockout pin operating mechanism 129 will be moved into an operative position and when it moves in the opposite direction the knockout pin operating mechanism will be moved into an inoperative position.

The knockout pin operating mechanism 129 is locked in its inoperative position by means of the catch 131 so as to cause the filler member 50 to become disengaged from or unlocked with respect to the knockout pin operating mechanism 129 as the coupling 138—139 will thereby be separated.

The knockout pin operating mechanism 129 may be of any suitable construction but is preferably so constructed that when it is in its operative position and when the platen and the mold section which is attached to the platen, are raised, after the top mold section 121 has been unlocked with respect to the bottom mold section 111, the pins or projections 130 on the knockout pin operating mechanism 129 will operate the ejector pins 122 to force the article out of the top mold section 121.

There are control valves provided wherever necessary and such valves may be operated in any suitable manner, preferably in the manner as heretofore described, and suitable pressure regulating valves may also be provided wherever desired or necessary.

If the material in the injection chamber is in excess of the amount required to form the article, the complete cycle of operation of the press need not be completed. That is, after the first article is formed it may be removed from the machine and then the operation continued or repeated until the final charge has been delivered into the mold, at which time the remaining portion of the cycle of operation above described may be performed.

In the event that several articles are to be formed from a single supply charge, it is advisable to determine at all times during the cycle of operation of the press, just what quantity of material remains in the injection chamber after the complete formation of the respective articles. To that end any suitable indicating means may be provided and such indicating means may preferably be actuated or controlled by the operation or position of the injection plunger with respect to the injection chamber.

The fluid pressure for operating the various parts of the press may be supplied from a common source such as from a pump or line supply.

While the preferred form of machine for carrying this method or process into operation has been shown and described, it is to be understood that various changes may be made in the details of construction and in the combination and arrangement of the parts of the machine, within the scope of the claims, without departing from the spirit of this invention.

What is claimed as new is:

1. In a press of the character described, a platen having a relatively long stroke, means for moving said platen and for exerting pressure thereupon, a ram having a relatively short stroke, means independent of said platen moving means for moving said ram independently of the platen and for exerting pressure upon the ram greatly in excess of the pressure exerted upon the platen by the platen moving means, the limit of the stroke of the ram terminating short of the platen, and means for interposing a compression member between the ram and platen, whereby the pressure of the ram will augment the pressure exerted upon said platen by the platen pressure exerting means.

2. In a press of the character described a platen having a relatively long stroke, fluid pressure means for moving said platen and for exerting pressure thereupon, a ram having a relatively short stroke, fluid pressure means independent of said platen moving means for moving said ram and for exerting pressure upon the ram greatly in excess of the pressure exerted by the platen moving means upon the platen, the limit of the stroke of the ram terminating short of the platen, means for interposing a compression member between the ram and platen, whereby the pressure of the ram will augment the pressure exerted upon said platen by the platen pressure exerting means, and means for controlling the said fluid pressures.

3. In a press of the character described a platen, a ram, a fluid circuit for suppling fluid pressure to the ram to exert a heavy pressure thereupon, means for moving the platen, a compression member, means for interposing said compression member between the platen and ram whereby the pressure of the ram may be exerted upon the platen, and means other than the said fluid circuit for increasing the fluid pressure upon the ram to an extent greater than the pressure in the fluid circuit.

4. In a press of the character described a platen, a ram movable independently of the platen, cylinder and piston means for operating the ram, a fluid circuit for supplying fluid pressure to the cylinder to exert a heavy pressure upon the ram, means other than the ram moving means for moving the platen, a compression member, means for interposing said compression member between the platen and ram whereby the pressure of the ram will augment the pressure exerted upon the platen by the platen pressure means, and means other than the said fluid circuit and for increasing the fluid pressure upon the ram to an extent greater than the pressure in the fluid circuit, the last said means embodying mechanism for reducing the size of the fluid containing space in the cylinder.

5. In a press of the character described a platen, a ram movable independently of the platen, a fluid circuit for supplying fluid pressure to the ram to exert a heavy pressure thereupon, means other than the ram moving means for moving the platen, a compression member, means for interposing the compression member between the platen and ram whereby the pressure of the ram will augment the pressure by the platen pressure means upon the platen, means other than the said fluid circuit for increasing the fluid pressure upon the ram to an extent greater than the pressure in the fluid circuit, and means for controlling at will the said fluid pressure increasing means.

6. In a press of the character described a platen, a ram movable independently of the platen, a fluid circuit for supplying fluid pressure to the ram to exert a heavy pressure thereupon, means other than the ram moving means for moving the platen, a compression member, means for interposing the compression members between the platen and ram whereby the pressure of the ram will augment the pressure by the platen pressure means upon the platen, means other than the said fluid circuit for increasing the fluid pressure upon the ram to an extent greater than the pressure in the fluid circuit, and pressure control valves for maintaining the fluid against flowing back into said circuit under such increased pressure.

7. In a press of the character described, a platen, a ram movable independently of the platen, cylinder and piston means for operating the ram, means other than the ram operating means for operating the platen, means for supplying fluid pressure to said cylinder, means for supplying fluid pressure to operate the platen, means other than the said fluid supplying means for increasing the fluid pressure upon the ram to an extent greater than the pressure in the fluid circuit, the last said means embodying a plunger other than the piston, means for forcing the plunger into the cylinder to displace fluid that is maintained in the cylinder, and means for controlling the movement of said plunger into and out of the cylinder.

8. In a press of the character described, a platen, a ram movable independently of the platen, cylinder and piston means for operating the ram, means other than the ram operating means for operating the platen, means for supplying fluid pressure to said cylinder, means for supplying fluid pressure to operate the platen, means other than the said fluid supplying means for increasing the fluid pressure upon the ram to an extent greater than the pressure in the fluid circuit, the last said means embodying a plunger other than the piston, means for forcing the plunger into the cylinder to displace fluid that is maintained in the cylinder, and means for controlling the movement of said plunger into and out of the cylinder, the last said means embodying means whereby the fluid pressure in the system will actuate said plunger.

9. In a press of the character described, a platen having a comparatively long stroke, a ram having a comparatively short stroke, means individual to the platen and ram for actuating them, a compression member movable into position between the ram and platen whereby the pressure of the ram will be exerted upon said platen and movable out of such position, means for thus moving said compression member, a mold knockout mechanism, and means for causing said knockout mechanism to move into and out of operative position between said ram and platen respectively when said compression member moves out of and into operative positions.

10. In a press of the character described, a platen having a comparatively long stroke, a ram having a comparatively short stroke, means individual to the platen and ram for actuating them, a compression member movable into position between the ram and platen whereby the pressure of the ram will be exerted upon said platen and movable out of such position, means for thus moving said compression member, a mold knockout mechanism, and means for causing said knockout mechanism to move into and out of operative position between said ram and platen respectively when said compression member moves out of and into operative positions, the last recited means embodying locking mechanism for temporarily locking the said compression member and the said knockout mechanism for movement in unison.

11. In a press of the character described, a platen having a comparatively long stroke, a ram having a comparatively short stroke, means individual to the platen and ram for actuating them, a compression member movable into position between the ram and platen whereby the pressure of the ram will be exerted upon said platen and movable out of such position, means for thus moving said compression member, a mold knockout mechanism, and means for causing said knockout mechanism to move into and out of operative position between said ram and platen respectively when said compression member moves out of and into operative positions, the last recited means embodying locking mechanism for temporarily locking the said compression member and the said knockout mechanism for movement in unison, and means to lock said knockout mechanism in inoperative position.

12. In a press of the character described, a platen having a comparatively long stroke, a ram having a comparatively short stroke, means individual to the platen and ram for actuating them, a compression member movable into position between the ram and platen whereby the pressure of the ram will be exerted upon said platen and movable out of such position, means for thus moving said compression member, a mold knockout mechanism, means for causing said knockout mechanism to move into and out of operative position between said ram and platen respectively when said compression member moves out of and into operative positions, the last recited means embodying locking mechanism for temporarily locking the said compression member and the said knockout mechanism for movement in unison, and manually controlled means for maintaining said knockout mechanism against movement by said compression member.

13. In a press of the character described, a platen having a comparatively long stroke, a ram having a comparatively short stroke, means individual to the platen and ram for actuating them independently one with respect to the other, a compression member movable into position between the ram and platen whereby the pressure of the ram will augment the pressure of the platen pressure means upon said platen and movable out of such position, means for thus moving said compression member, a mold knockout mechanism, means for causing said knockout mechanism to move into and out of operative position between said ram and platen alternately with said compression member, means controllable at will for rendering said knockout mechanism active and inactive with respect to the movement of the compression member out of position from between the ram and platen, and means mounting said compression member and said knockout mechanism upon said ram for movement therewith and with respect thereto.

14. In a press of the character described, a platen having a relatively long stroke, means for moving said platen and for exerting a substantially uniform pressure thereupon, a ram having a relatively short stroke, means for moving said ram independently of said platen and for exerting pressure upon the ram greatly in excess of the pressure exerted by the platen moving means upon the platen, the limit of the stroke of the ram terminating short of the platen, means for interposing a compression member between the ram and platen, whereby the pressure of the ram will augment the pressure exerted upon said platen by the platen pressure exerting means, and positive stopping means for arresting the movement imparted to said ram by its operating means.

GEORGE W. WACKER.